US011618488B2

(12) United States Patent
Kim et al.

(10) Patent No.: US 11,618,488 B2
(45) Date of Patent: Apr. 4, 2023

(54) FOLDABLE CONTAINER AND APPARATUS FOR FOLDING AND UNFOLDING THE SAME

(71) Applicant: Korea Railroad Research Institute, Uiwang-si (KR)

(72) Inventors: Hag Seoung Kim, Hwaseong-si (KR); Yong Jang Kwon, Gunpo-si (KR); Suk Lee, Seoul (KR); Keun Yul Yang, Uiwang-si (KR); Jong Un Won, Suwon-si (KR); Youn Keun Bhang, Seoul (KR); Young Joo Kim, Anyang-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 732 days.

(21) Appl. No.: 16/687,980

(22) Filed: Nov. 19, 2019

(65) Prior Publication Data
US 2020/0087059 A1 Mar. 19, 2020

Related U.S. Application Data

(62) Division of application No. 15/580,894, filed as application No. PCT/KR2016/006167 on Jun. 10, 2016, now Pat. No. 10,787,311.

(30) Foreign Application Priority Data

Jun. 11, 2015 (KR) .................. 10-2015-0082544
Jun. 26, 2015 (KR) .................. 10-2015-0091157

(51) Int. Cl.
B62B 3/02 (2006.01)
B65D 88/52 (2006.01)
(Continued)

(52) U.S. Cl.
CPC .............. *B62B 3/02* (2013.01); *B65D 88/121* (2013.01); *B65D 88/52* (2013.01); *B65D 88/522* (2013.01); *B66D 3/18* (2013.01); *B65D 88/524* (2013.01)

(58) Field of Classification Search
CPC ... B65D 9/22; B65D 9/12; B65D 7/24; B65D 7/26; B65D 7/28; B65D 7/30; B65D 7/32;
(Continued)

(56) References Cited

U.S. PATENT DOCUMENTS 4,214,669 A   7/1980  McQuiston
4,388,995 A   6/1983  Ahn
(Continued)

FOREIGN PATENT DOCUMENTS

CN   101039853 A   9/2007
CN   102317180 A   1/2012
(Continued)

OTHER PUBLICATIONS

International Search Report for PCT/KR2016/006167 dated Oct. 11, 2016.
(Continued)

Primary Examiner — Kareen K Thomas
(74) Attorney, Agent, or Firm — Pearne & Gordon LLP

(57) ABSTRACT

A foldable container according to an exemplary embodiment of the present disclosure includes: a lower panel; an upper panel provided in parallel with the lower panel; first and second lateral panels of which upper and lower ends are respectively connected to the upper panel and the lower panel to be rotatable along a longitudinal direction of the upper panel and the lower panel and which are configured to be folded toward the inside of the foldable container; and (Continued)

front and rear panels connected to the lower panel to be rotatable along a transverse direction of the lower panel.

24 Claims, 61 Drawing Sheets

(51) Int. Cl.
*B65D 88/12* (2006.01)
*B66D 3/18* (2006.01)

(58) Field of Classification Search
CPC ...... B65D 11/18; B65D 88/121; B65D 88/52; B65D 88/522; B65D 88/524; B65D 88/12; B62B 3/02; B66D 3/18
See application file for complete search history.

(56) References Cited

U.S. PATENT DOCUMENTS

| | | | |
|---|---|---|---|
| 4,506,798 A | | 3/1985 | Goutille |
| 4,577,772 A | | 3/1986 | Bigliardi |
| 5,190,179 A | | 3/1993 | Richter et al. |
| 5,338,136 A | * | 8/1994 | Hetchler ............... B60P 7/083 |
| | | | 24/68 CD |
| 5,351,827 A | * | 10/1994 | Baka .................... B60P 7/12 |
| | | | 206/391 |
| 5,862,912 A | * | 1/1999 | Schelhorn ............. B65D 71/00 |
| | | | 206/499 |
| 6,296,133 B1 | * | 10/2001 | Cobane ................. B65D 7/26 |
| | | | 220/9.4 |
| 7,870,970 B2 | | 1/2011 | Fisk |
| 8,408,412 B2 | | 4/2013 | Hong |
| 9,643,775 B2 | * | 5/2017 | Kraft ..................... B65D 88/522 |
| 9,896,263 B2 | | 2/2018 | Leong |
| 2008/0029510 A1 | | 2/2008 | Fisk |
| 2012/0006816 A1 | | 1/2012 | Turnquist |
| 2013/0020316 A1 | | 1/2013 | Hong |
| 2014/0144907 A1 | * | 5/2014 | Giesbers ............. B65D 88/524 |
| | | | 220/1.5 |
| 2014/0263306 A1 | * | 9/2014 | Brennan, Jr. ........... B65D 9/18 |
| | | | 16/221 |
| 2015/0108120 A1 | | 4/2015 | Leong |

FOREIGN PATENT DOCUMENTS

| | | |
|---|---|---|
| CN | 103253463 A | 8/2013 |
| CN | 103848119 A | 6/2014 |
| DE | 10 2009 004795 A1 | 7/2010 |
| EP | 1796990 B1 | 6/2007 |
| JP | H02-123286 A | 5/1990 |
| JP | H04-031282 A | 2/1992 |
| JP | 06-278726 A | 10/1994 |
| JP | 07-125733 A | 5/1995 |
| JP | 3030297 U | 10/1996 |
| JP | 2002-068136 A | 3/2002 |
| JP | 2015-093734 A | 5/2015 |
| KR | 10-1988-0002644 B1 | 12/1988 |
| KR | 10-1999-0064773 A | 8/1999 |
| KR | 10-1258612 B1 | 4/2013 |
| KR | 10-1375806 B1 | 3/2014 |
| KR | 10-2014-0049667 A | 4/2014 |
| KR | 10-1488384 B1 | 2/2015 |
| WO | 2005/070790 A1 | 8/2005 |
| WO | 2006/024104 A1 | 3/2006 |
| WO | 2012-036544 A1 | 3/2012 |
| WO | 2014/142824 A1 | 9/2014 |

OTHER PUBLICATIONS

European Search Report for Application No. 16807835.0, dated Dec. 21, 2018.
European Search Report of EP Application No. 19218185.7 dated, Feb. 12, 2020.

* cited by examiner

FOLDABLE CONTAINER AND APPARATUS FOR FOLDING AND UNFOLDING THE SAME

CROSS-REFERENCE TO RELATED APPLICATION

This application is a divisional application of U.S. application Ser. No. 15/580,894 filed on Dec. 8, 2017, which claims the benefit of PCT Application No. PCT/KR2016/006167 filed on Jun. 10, 2016, the entire contents of which are incorporated herein by reference.

TECHNICAL FIELD

The present disclosure relates to a foldable container and an apparatus for folding and unfolding the same.

BACKGROUND

In general, a container includes four corner beams as supports and panels each having a predetermined area as six surfaces, i.e., front, rear, left, right, top, and bottom surfaces, between the supports and interlocked and assembled by welding or using a fastening means such as rivet to form a space therein for transport or storage of freight.

However, a conventional container has a fixed space regardless of whether freight is loaded or not, and, thus, even when an empty container without freight is transported, the empty container needs to be transported as mounted on a freight truck in spite of being light in weight like a container loaded with freight. Therefore, a single freight truck cannot transport multiple empty containers stacked thereon.

Further, when transported on a ship in a harbor, containers are stacked in multiple stages. Like containers loaded with freight, empty containers are also transported as stacked and thus occupy a lot of space of the ship, which results in an increase in cost of transport.

Further, when empty containers without freight are stored, the containers are stacked in multiple stages. Since the containers are stacked in their original form, they require a wide storage place.

Furthermore, general containers for shipping freight are high-weight and large-sized structure unlike lightweight plastic containers and thus can be damaged or deformed by load and collision when stacked.

In this regard, Korean Patent Laid-open Publication No. 10-1999-0064773 (entitled "Foldable container house") discloses a foldable container house in which a front plate and a rear plate provided as a pair of foldable unit members between top and bottom plates formed as single boards to cover a front side and a rear side, respectively, and upper portions of lateral plates are formed as free ends and lower portions thereof are connected to the bottom plate with pivot pins, and, thus, the front and rear plates and the lateral plates are foldable to each other.

DISCLOSURE OF THE INVENTION

Problems to be Solved by the Invention

The present disclosure is conceived to solve the above-described problem of the conventional technology and provides an apparatus for folding and unfolding a foldable container which makes it possible to reduce the costs of folding and unfolding a foldable container and increase the safety and efficiency in folding and unfolding.

Further, the present disclosure provides a collapsible container which makes it possible to endure a load of stacked containers when multiple unfolded or folded containers are stacked.

Furthermore, the present disclosure provides an apparatus for opening and closing a collapsible container which makes it possible to reduce the opening and closing costs of folding and unfolding a collapsible container and increase the safety and efficiency in opening and closing.

Means for Solving the Problems

As a means for solving the above-described technical problem, an apparatus located in front/rear of a foldable container for marine transportation for folding and unfolding a foldable container according to a first aspect of the present disclosure includes a main body; an upper fixing unit provided on an upper part of the main body and configured to fix an upper part of the foldable container as an upper fixing piece inserted into an insertion groove formed in an upper corner fitting of the foldable container; a front/rear side folding/unfolding unit provided on the upper part of the main body and configured to fold and unfold a front panel or a rear panel of the foldable container; and an up/down folding/unfolding unit configured to move the upper fixing unit up and down to move an upper panel and lateral panels of the foldable container up and down to fold lateral panels.

Effects of the Invention

According to the aspects of the present disclosure, empty containers without freight among containers used for freight transport can be folded and then stacked, and, thus, the efficiency in storage and transport can be greatly increased.

Further, in the case of storage or transport of empty containers, folded containers can be stacked and then stored and transported in batches, and, thus, the efficiency in maintenance of containers and a life of the containers can be increased.

Furthermore, an upper side sill and an upper reinforcing piece combined with a longitudinal frame of an upper panel and a lower side sill and a lower reinforcing piece combined with a longitudinal frame of a lower panel are provided, and, thus, it is possible to endure a vertical load of stacked containers, a freight load applied when freight is loaded, and lifting of an upper part of a container.

Besides, a separate apparatus for folding and unfolding a foldable container is used, and, thus, the foldable container can be folded and unfolded safely and conveniently. Further, a reach stacker and a forklift which are high-priced equipment of handling containers do not need to be used. Thus, the present disclosure has more economic effects.

Moreover, a worker can easily move the folding/unfolding apparatus, and when a foldable container is folded and unfolded, the low-priced folding/unfolding apparatus is used instead of high-priced container handling equipment. Thus, the costs of folding and unfolding the foldable container can be reduced.

Further, various safety devices and dedicated devices are provided to be suitable for the order and characteristics of folding and unfolding a foldable container. Thus, the foldable container can be rapidly folded and unfolded in a stable and efficient manner.

BRIEF DESCRIPTION OF THE DRAWINGS

FIGS. 23A and 22B provide enlarged views of portions I and J in FIG. 21B.

MODE FOR CARRYING OUT THE INVENTION

Figure 1:
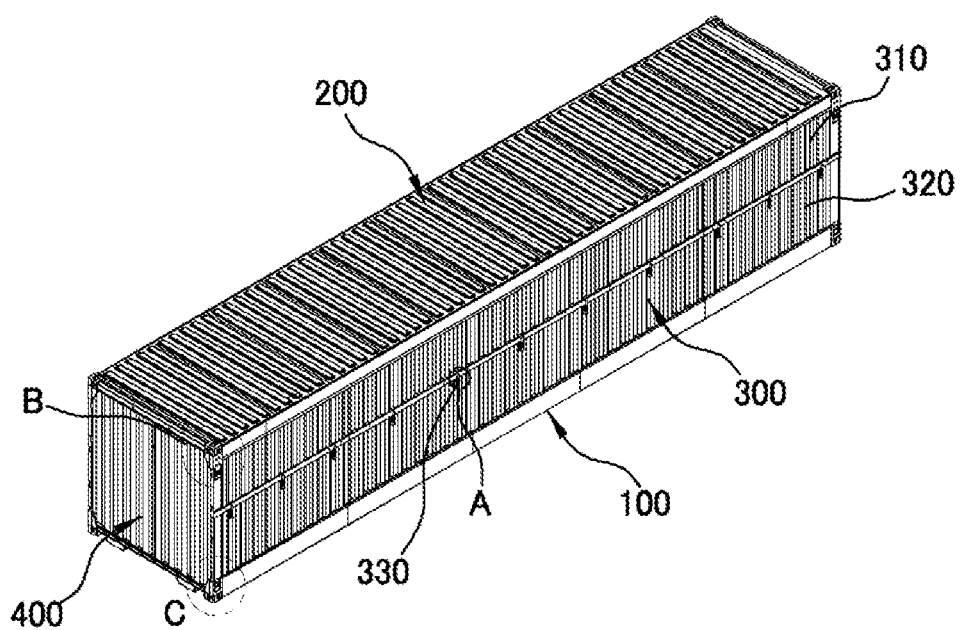
FIG. 1 is a perspective view of a foldable container in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

The present disclosure relates to a foldable container and an apparatus for folding and unfolding the same.

Figure 2:
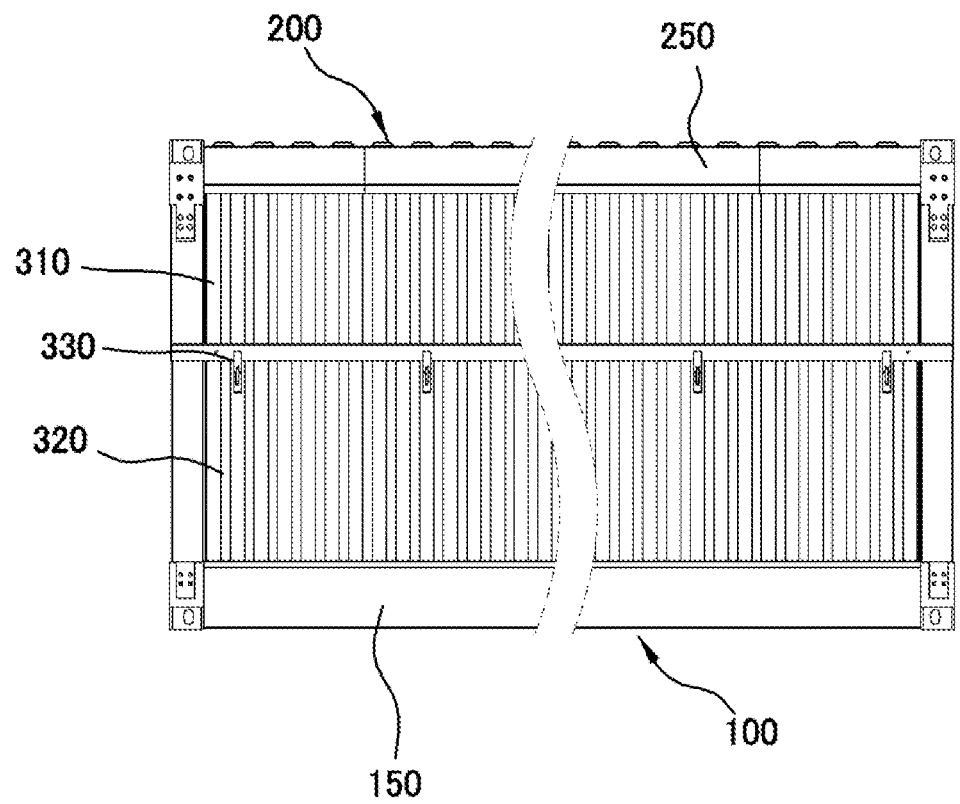
FIG. 2 is a side view of the foldable container in accordance with an exemplary embodiment of the present disclosure.
Figure 3A:
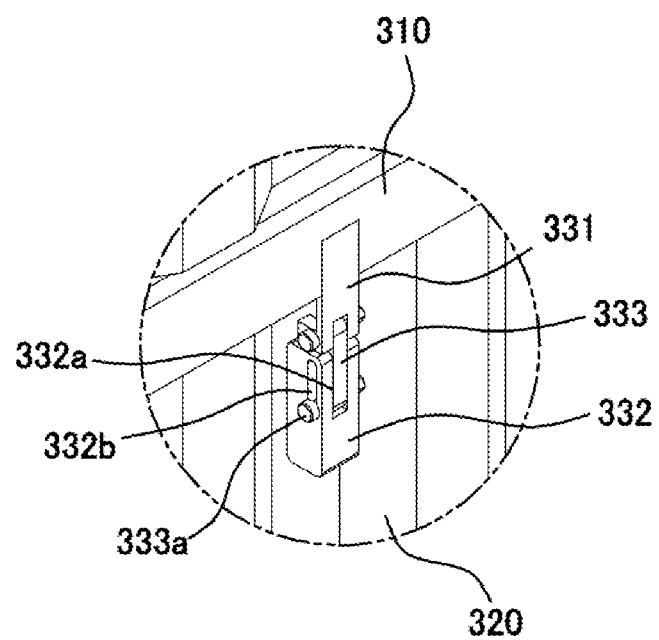
FIG. 3A, FIG. 3B and FIG. 4 are enlarged views of a portion A in FIG. 1 and exemplary operation diagrams of a sliding joint in accordance with an exemplary embodiment of the present disclosure.
Figure 3B:
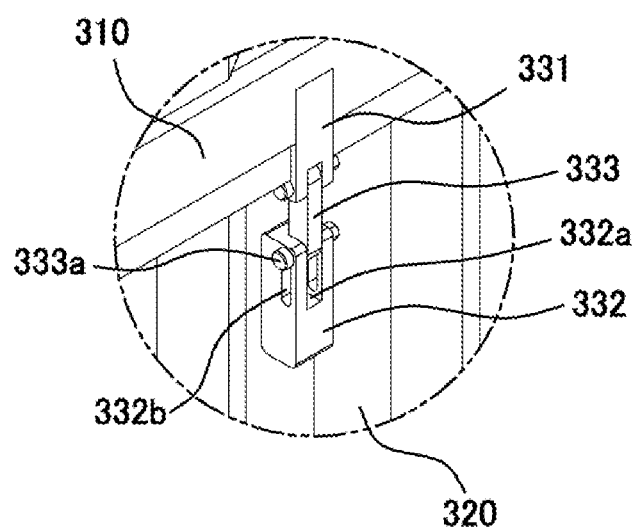
Figure 4:
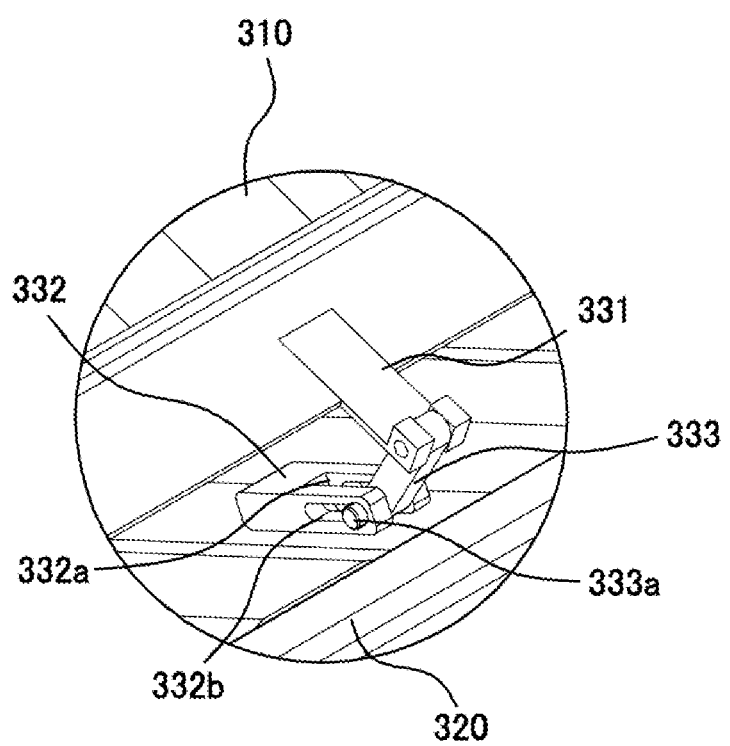
Figure 5A:
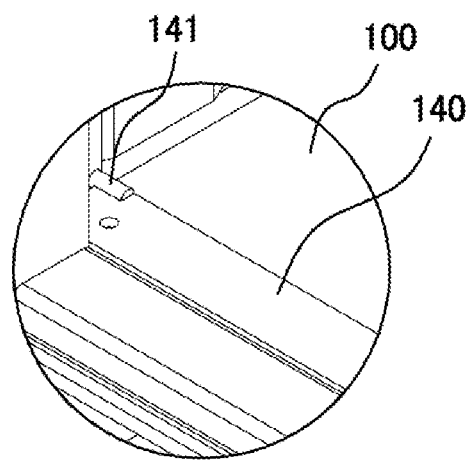
FIGS. 5A and 5B provide a partially enlarged view and a partial cross-sectional view of a lower panel in accordance with an exemplary embodiment of the present disclosure.
Figure 5B:
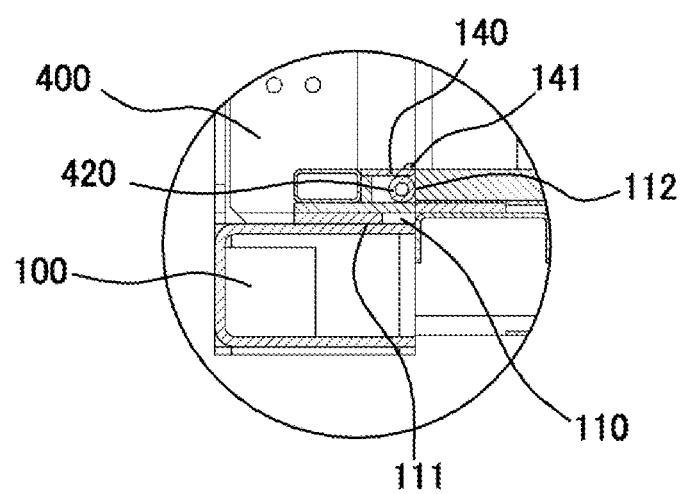
Figure 6A:
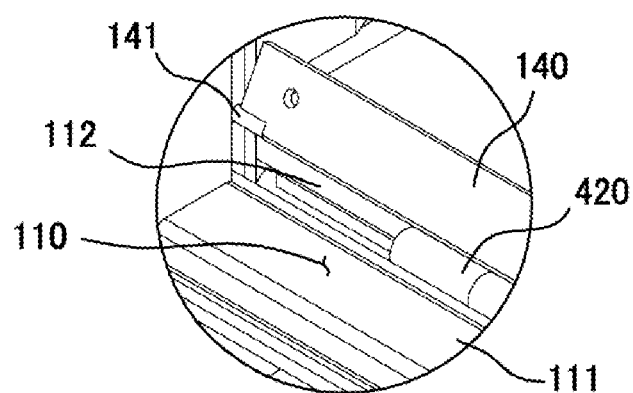
FIGS. 6A and 6B provide exemplary operation diagrams of a cover portion in accordance with an exemplary embodiment of the present disclosure.
Figure 6B:
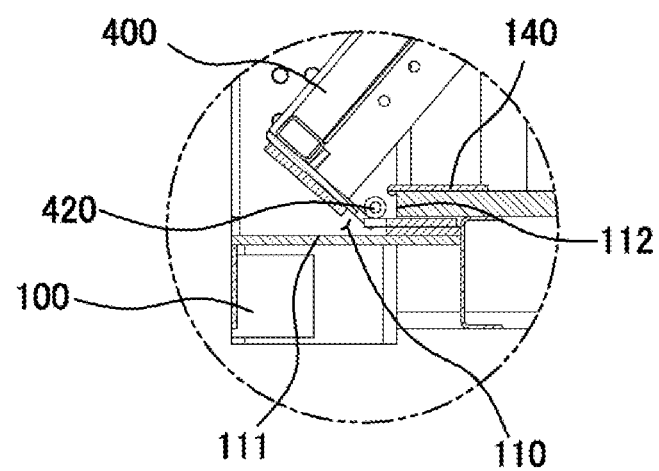
Figure 7A:
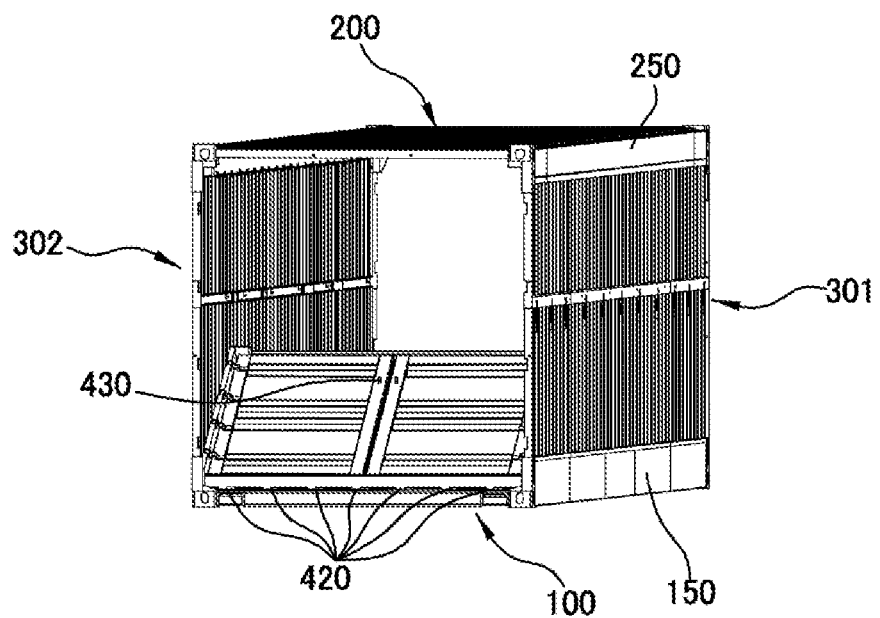
FIGS. 7A and 7B provide diagrams illustrating a hinge portion of a front panel in accordance with an exemplary embodiment of the present disclosure.
Figure 7B:
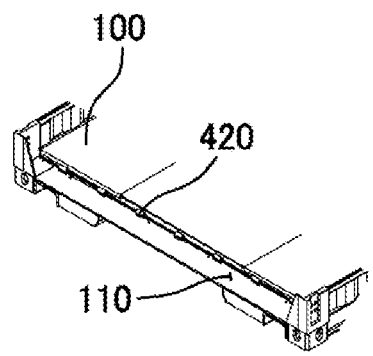
Figure 8A:
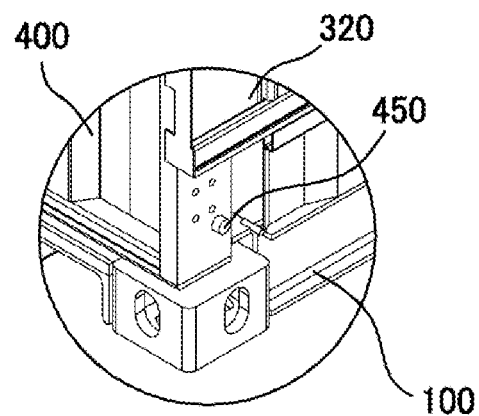
FIGS. 8A and 8B provide a partial perspective view and a partially see-through view of a lower edge of the foldable container in accordance with an exemplary embodiment of the present disclosure.
Figure 8B:
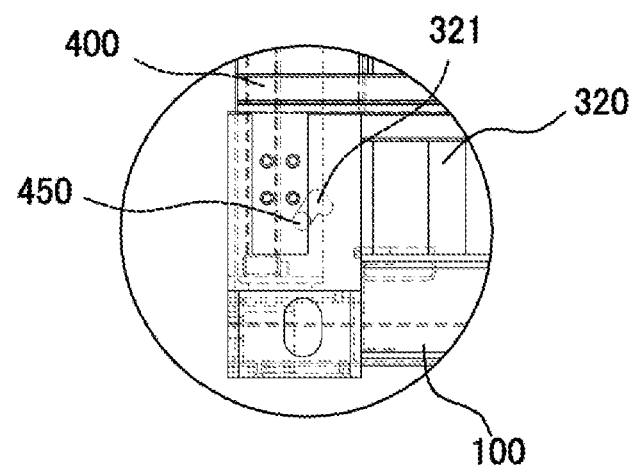
Figure 9:
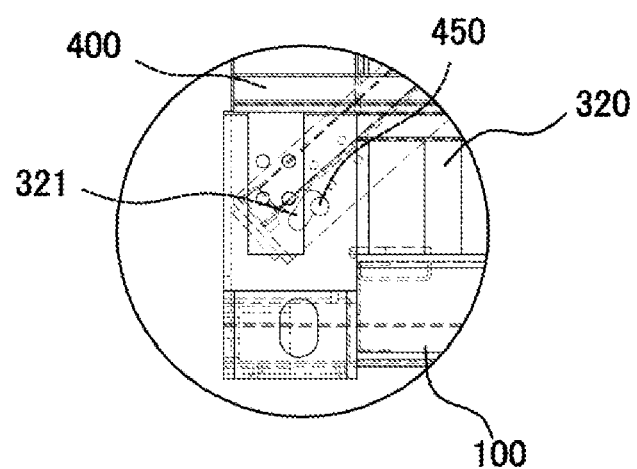
FIG. 9 is a diagram provided to illustrate an operating of folding a front panel illustrated in FIG. 8.
Figure 10:
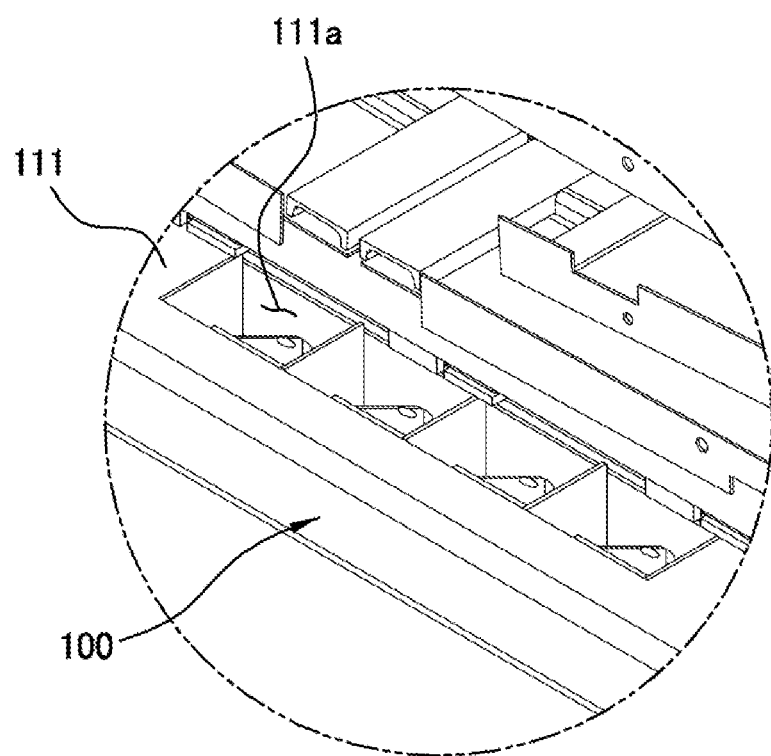
FIG. 10 is a diagram provided to explain a locking device storage unit in accordance with an exemplary embodiment of the present disclosure.
Figure 11A:
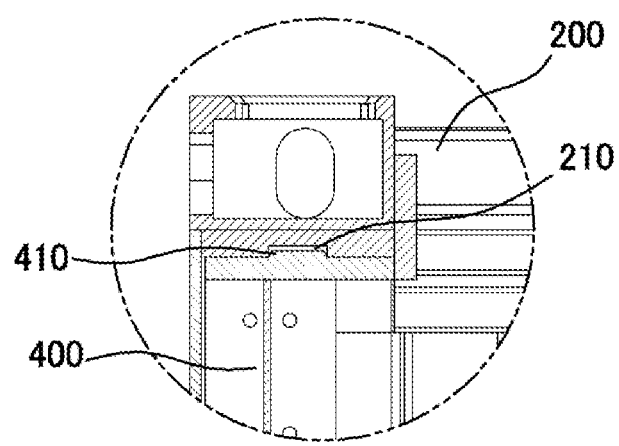
FIGS. 11A and 11B are a diagram provided to explain a configuration for fixing a front panel and a rear panel to an upper panel in accordance with an exemplary embodiment of the present disclosure.
Figure 11B:
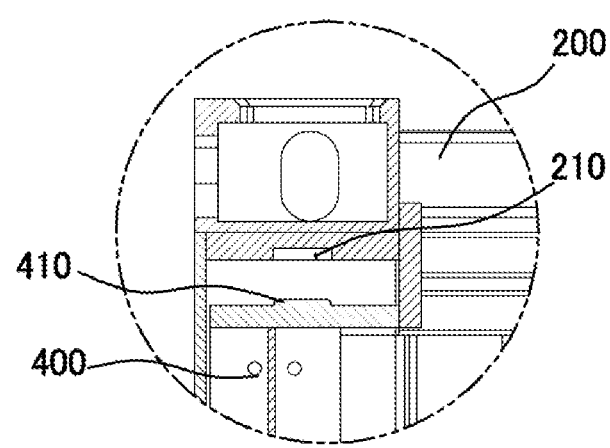
Figure 12A:
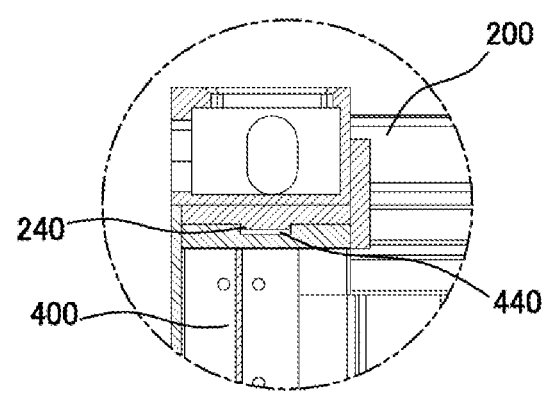
FIGS. 12A and 12B are a diagram provided to explain a configuration for fixing a front panel and a rear panel to an upper panel in accordance with another exemplary embodiment of the present disclosure.
Figure 12B:
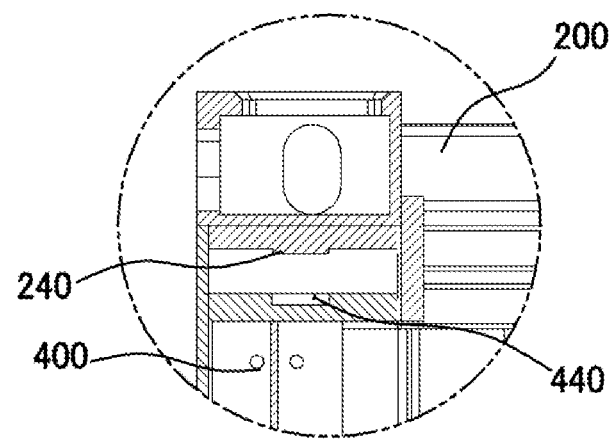
Figure 13A:
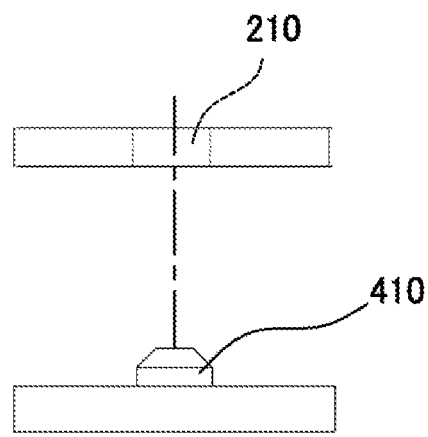
FIG. 13A is a side view of a configuration fixed by the front panel and the rear panel illustrated in FIGS. 11A and 11B and FIG. 13B is a side view of a configuration fixed by the front panel and the rear panel illustrated in FIGS. 12A and 12B.
Figure 13B:
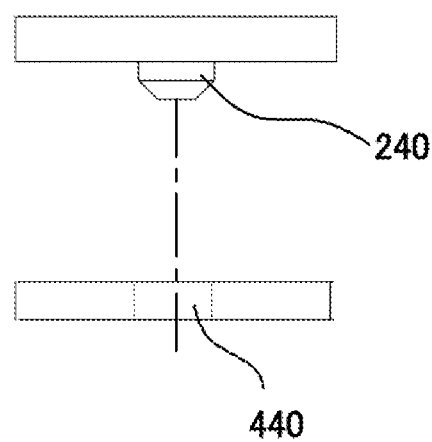
Figure 14A:
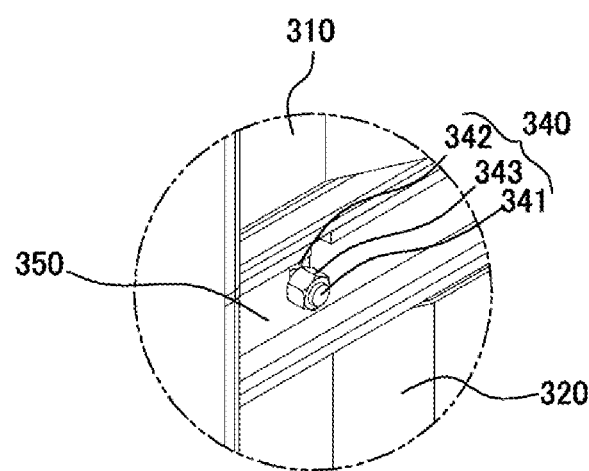
FIGS. 14A and 14B are a diagram provided to explain a member for fixing a lateral panel in accordance with an exemplary embodiment of the present disclosure.
Figure 14B:
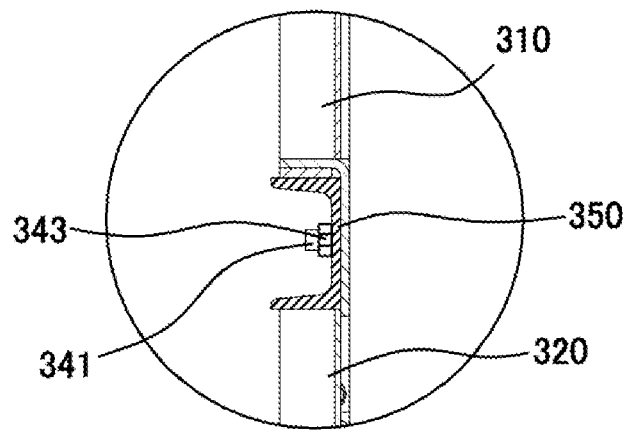
Figure 15:
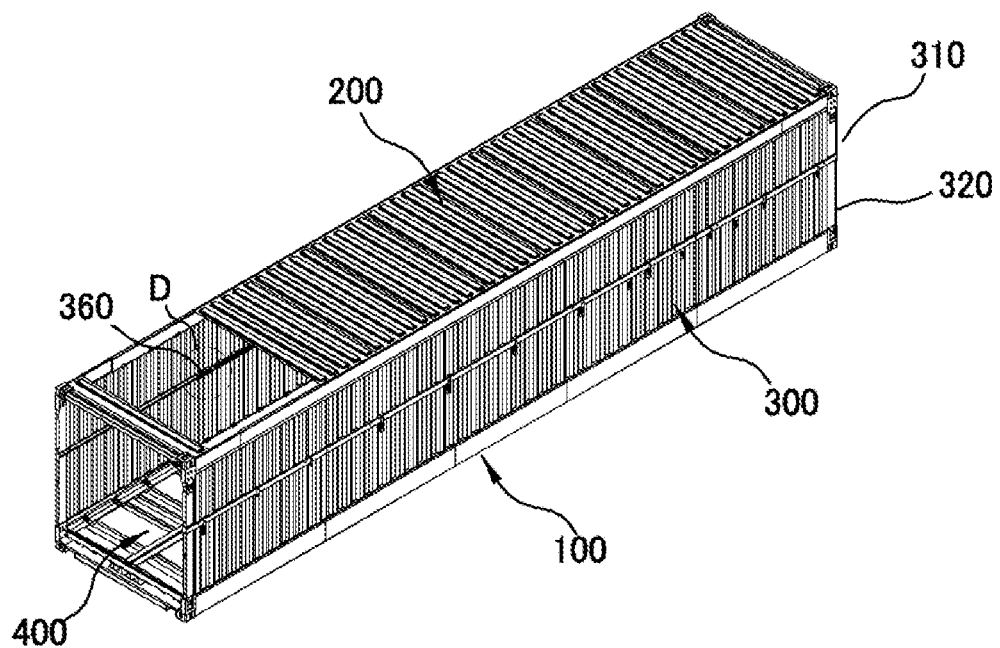
FIG. 15 is a partial cross-sectional perspective view of the foldable container in accordance with an exemplary embodiment of the present disclosure.
Figure 16A:
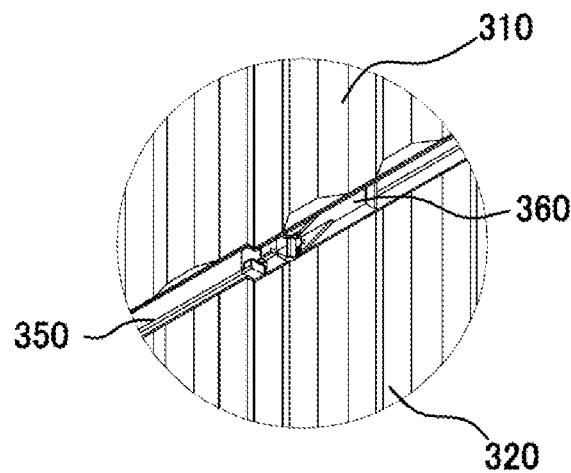
FIGS. 16A and 16B are an enlarged view of a portion D in FIG. 15.
Figure 16B:
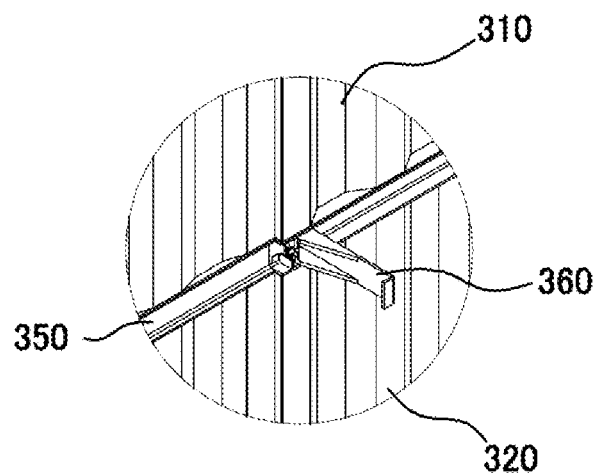
Figure 17A:
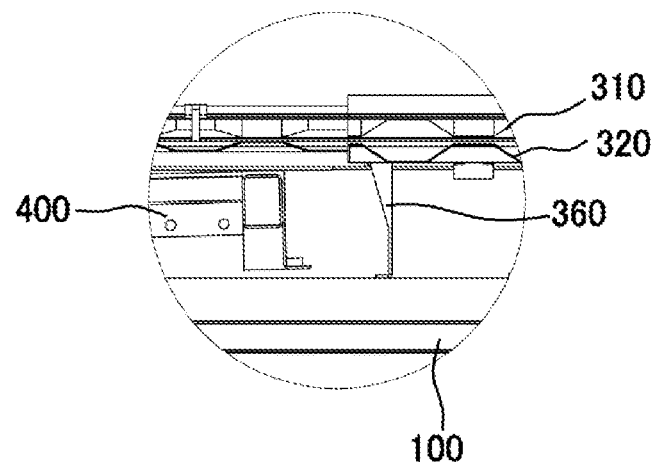
FIGS. 17A and 17B provide exemplary operation diagrams of a lateral panel supporting unit in accordance with an exemplary embodiment of the present disclosure.
Figure 17B:
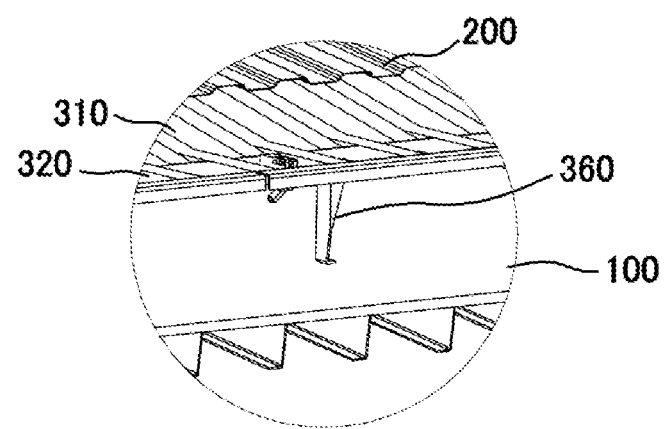
Figure 18A:
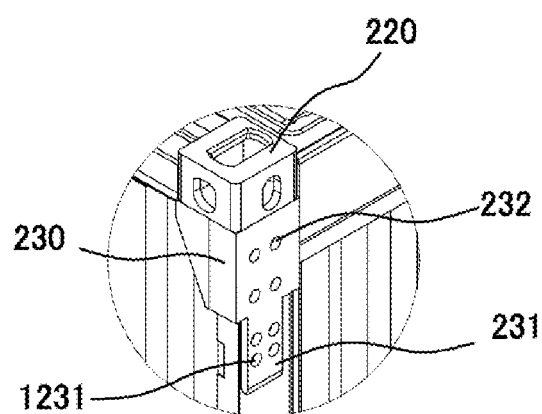
FIGS. 18A and 18B provide enlarged views of portions B and C in FIG. 1.
Figure 18B:
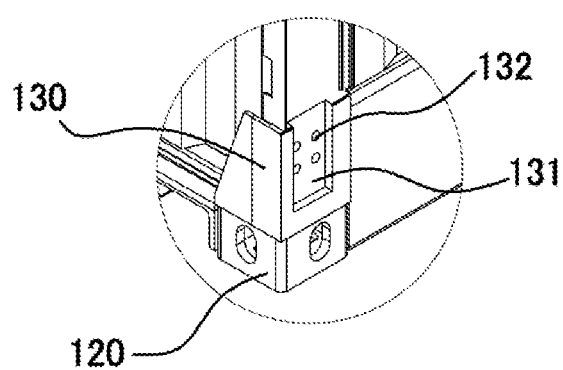
Figure 19:
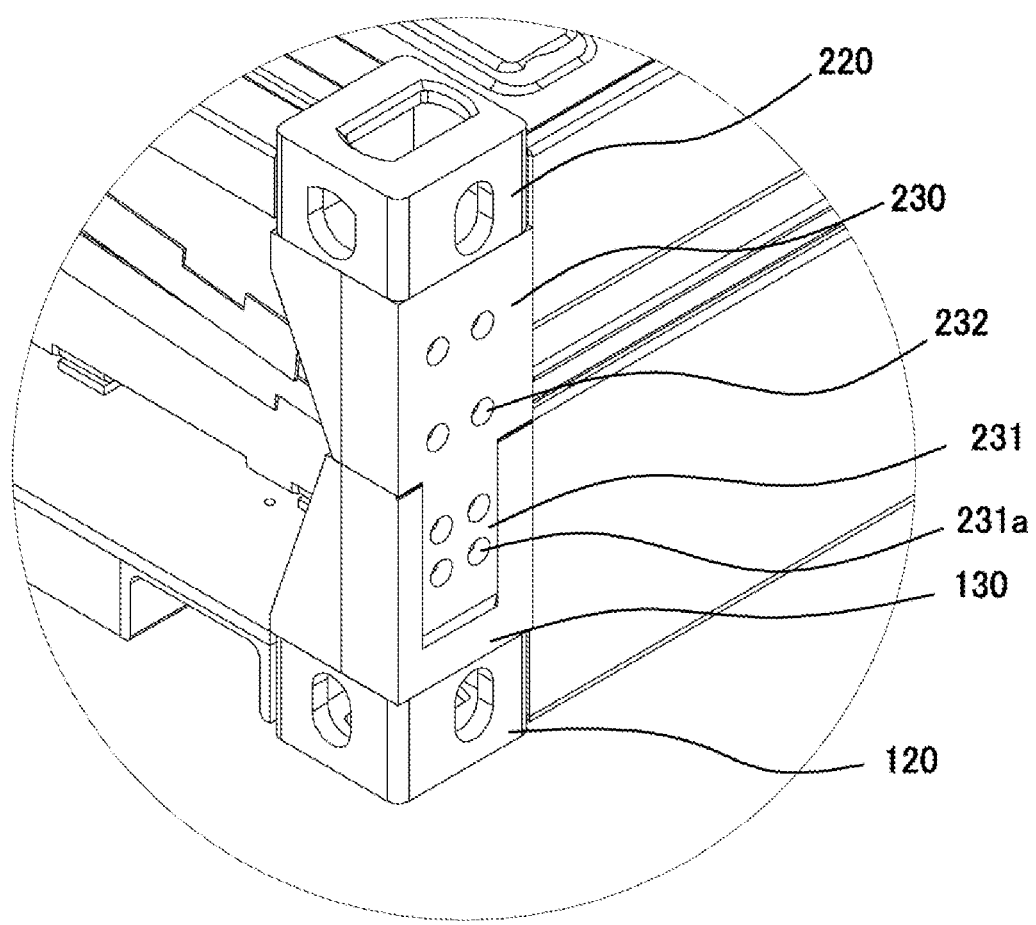
FIG. 19 is a diagram provided to explain an upper reinforcing piece and a lower reinforcing piece in accordance with an exemplary embodiment of the present disclosure.
Figure 20:
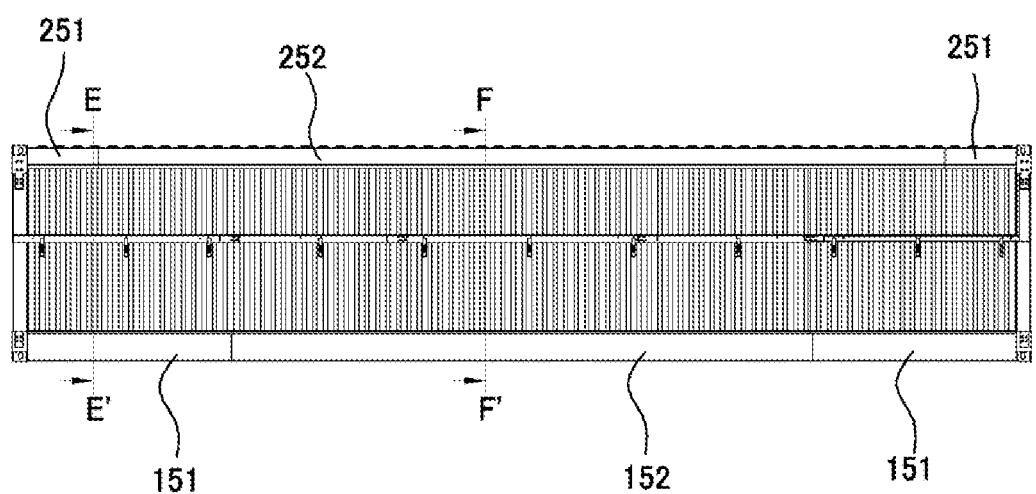
FIG. 20 is a side view of the foldable container in accordance with an exemplary embodiment of the present disclosure.
Figure 21A:
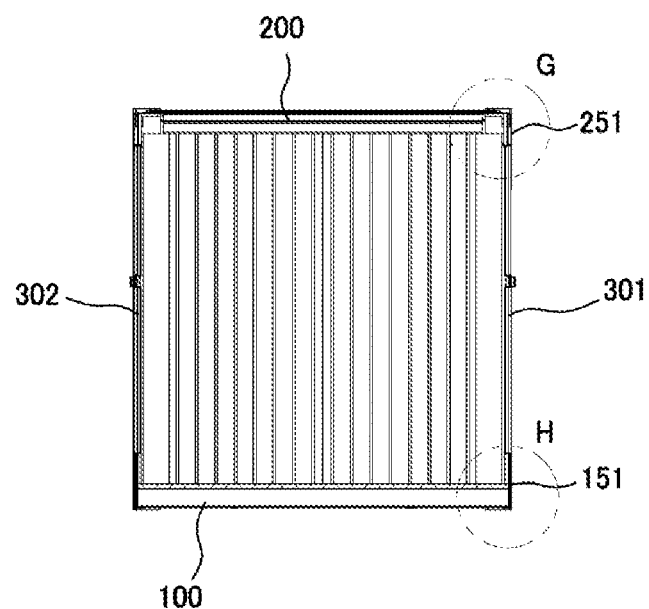
FIG. 21A is a cross-sectional view taken along a line E-E' in FIG. 20
Figure 21B:
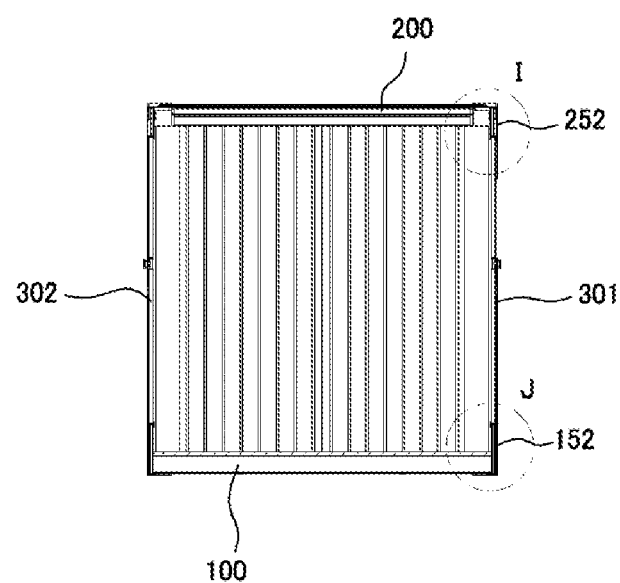
FIG. 21B is a cross-sectional view taken along a line F-F' in FIG. 20.
Figure 22A:
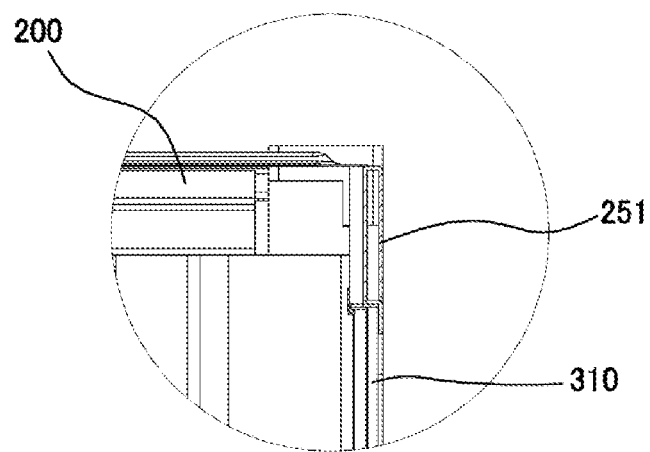
FIGS. 22A and 22B provide enlarged views of portions G and H in FIG. 21A.
Figure 22B:
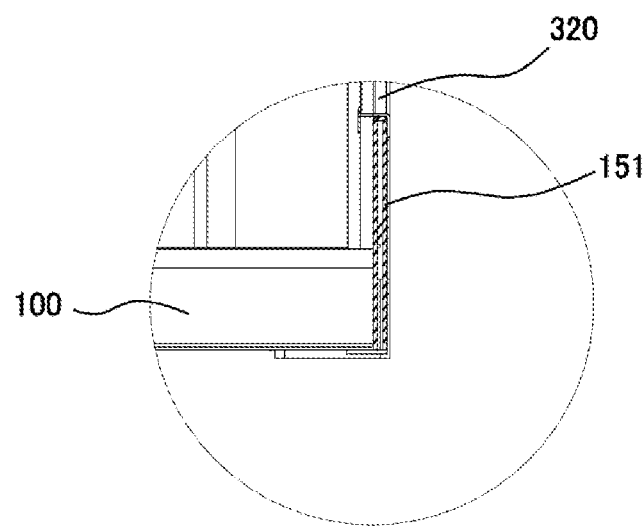
Figure 23A:
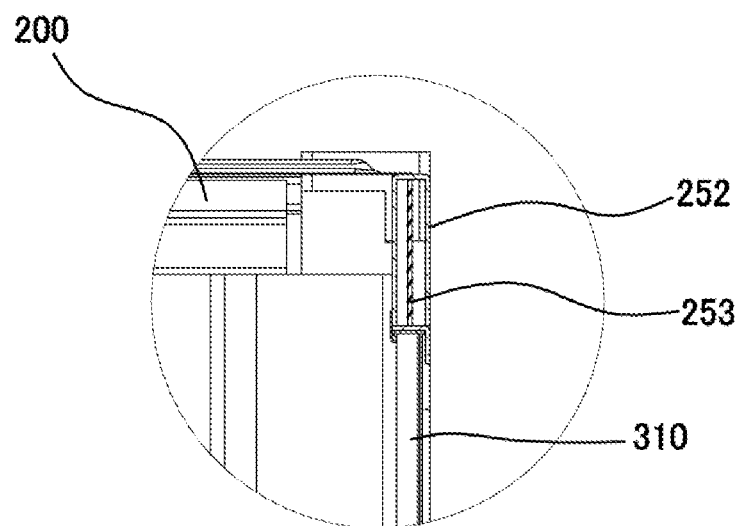
Figure 23B:
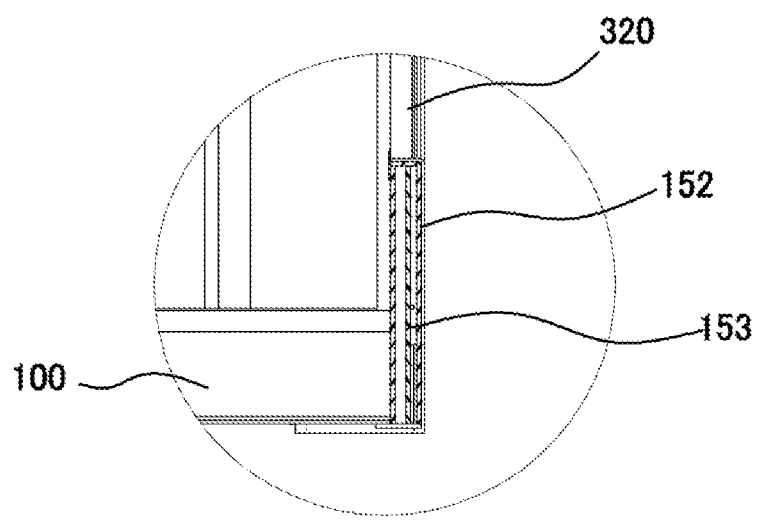
Figure 24:
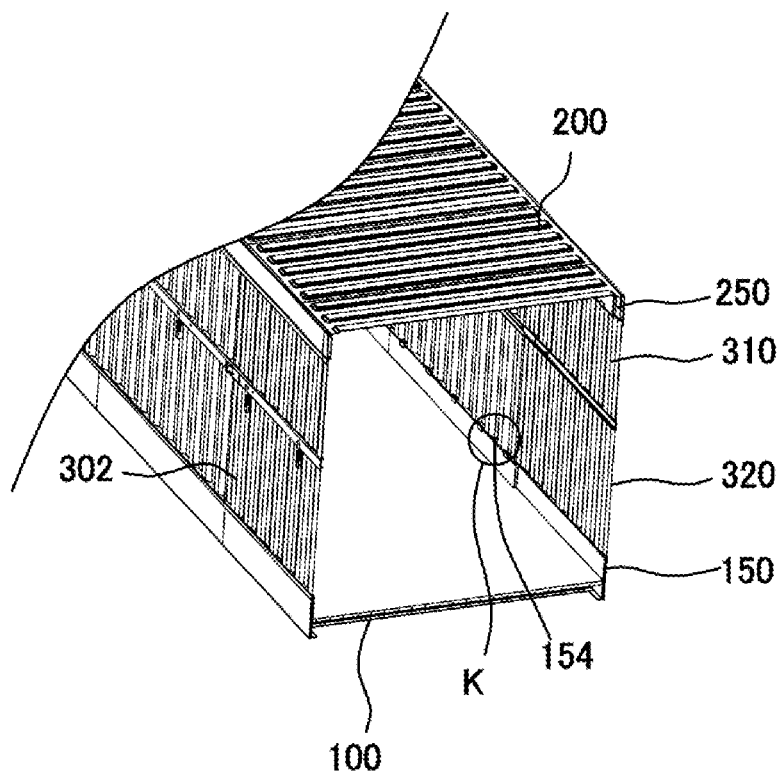
FIG. 24 is a cross-sectional perspective view taken along a line E-E' in FIG. 20.
Figure 25A:
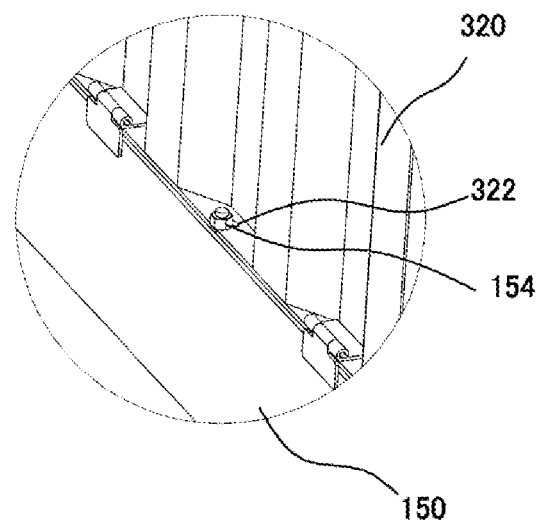
FIG. 25A is an enlarged view of a portion K in FIG. 24
Figure 25B:
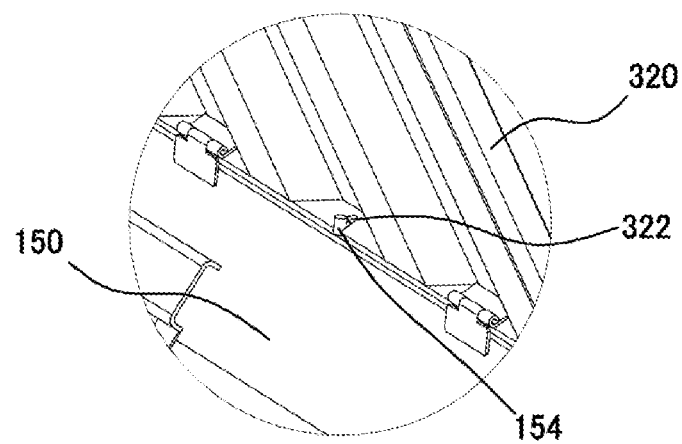
FIG. 25B is a diagram provided to explain a fixing member of a lower lateral panel.
Figure 26A:
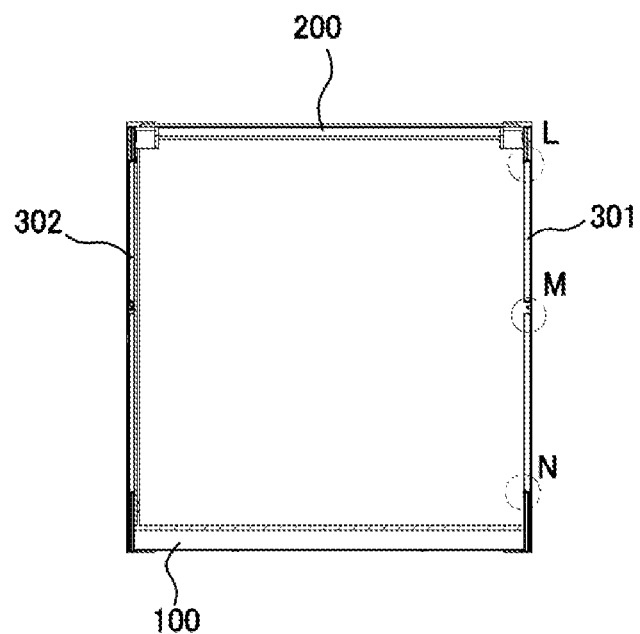
FIGS. 26A and 26B provide cross-sectional views of the foldable container in accordance with an exemplary embodiment of the present disclosure.
Figure 26B:
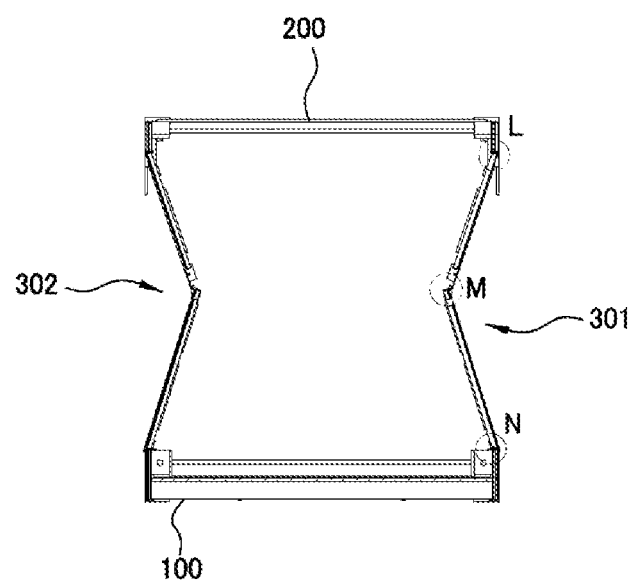
Figure 27A:
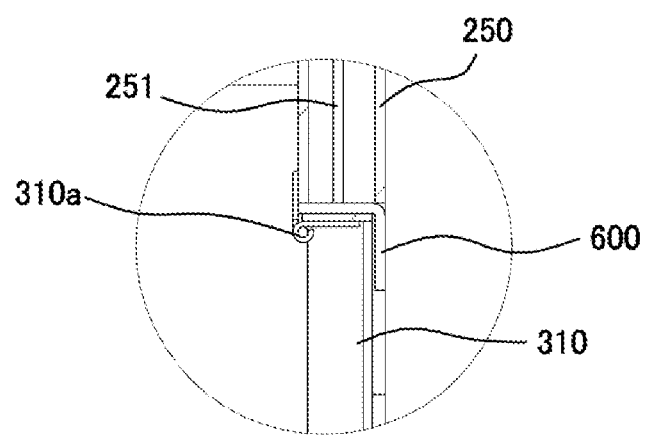
FIG. 27A provides enlarged views of a portion L in FIG. 26A and FIG. 27B provides enlarged views of a portion L in FIG. 26B.
Figure 27B:
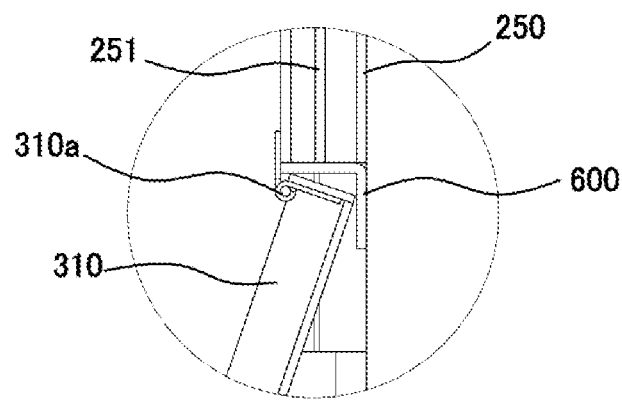
Figure 28A:
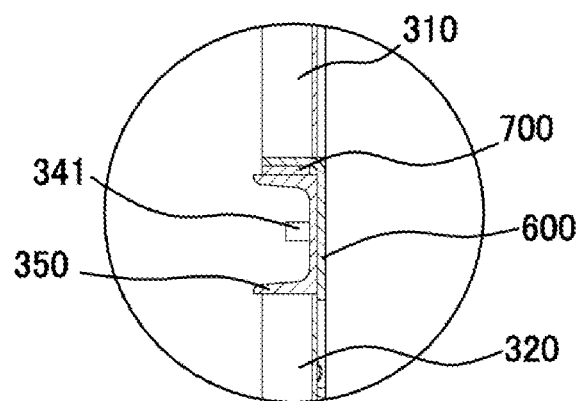
FIG. 28A provides enlarged views of a portion M in FIG. 26A and FIG. 28B provides enlarged views of a portion M in FIG. 26B.
Figure 28B:
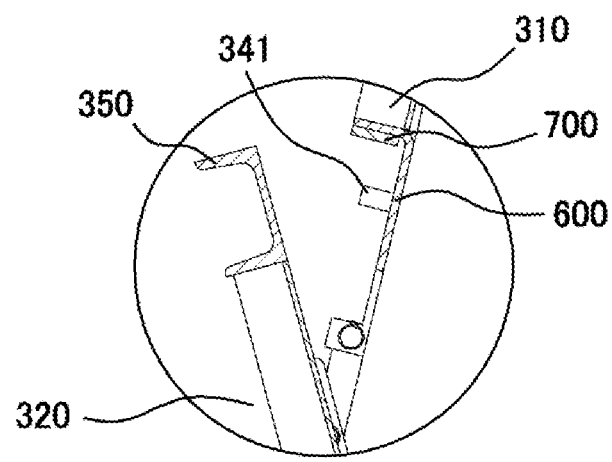
Figure 29A:
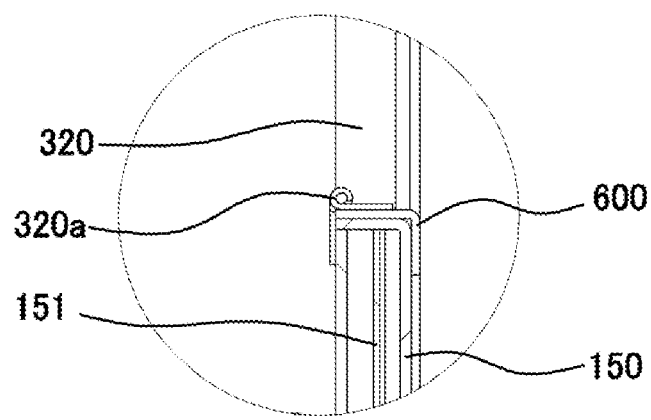
FIG. 29A provides enlarged views of a portion N in FIG. 26A and FIG. 29B provides enlarged views of a portion N in FIG. 26B.
Figure 29B:
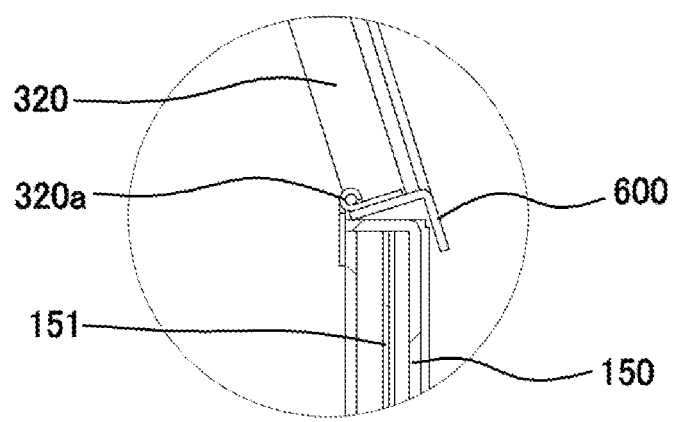
Figure 30A:
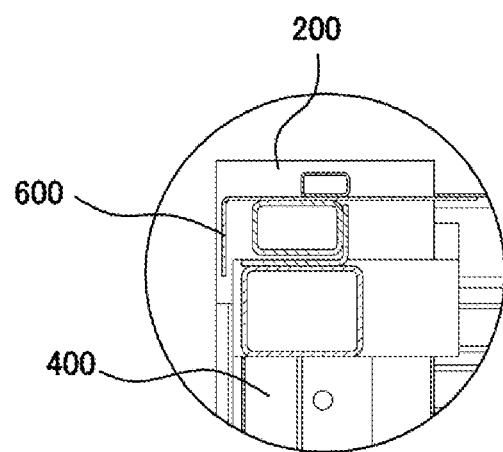
FIGS. 30A and 30B provide diagrams to explain a panel connection protection unit in accordance with an exemplary embodiment of the present disclosure.
Figure 30B:
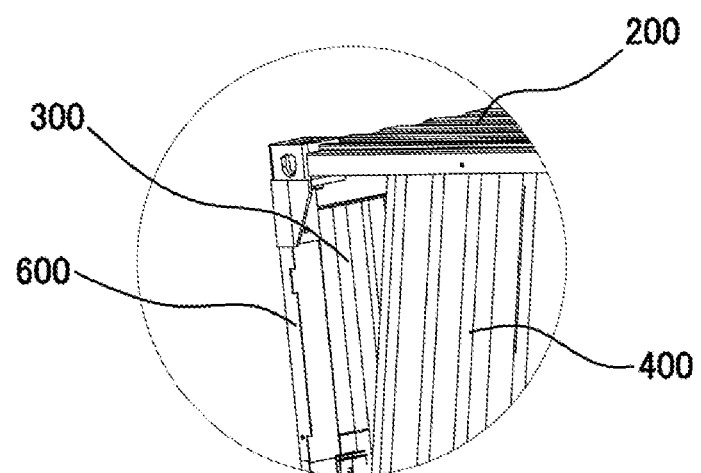
Figure 31A:
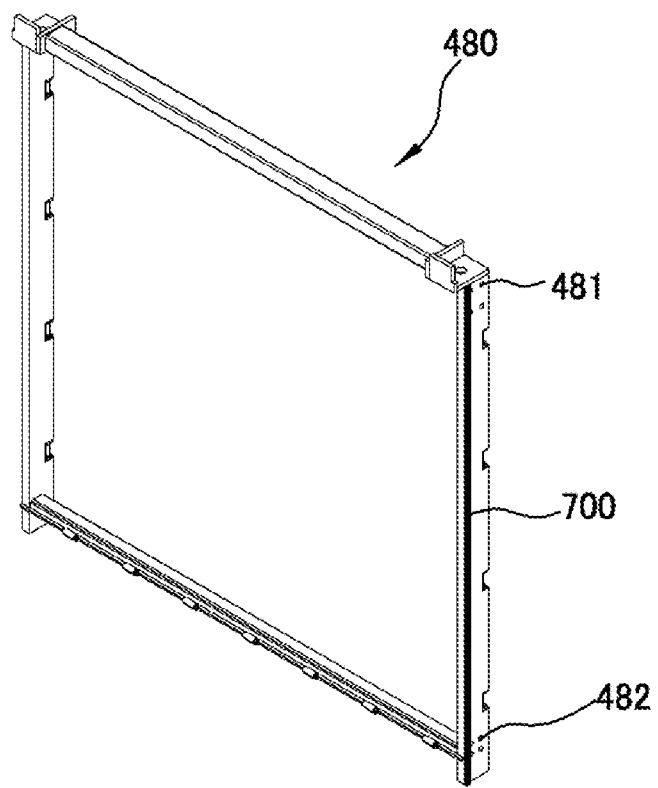
FIG. 31A provides a perspective view of a frame of a front panel in accordance with an exemplary embodiment of the present disclosure and FIG. 31B provides a side view of a frame of a front panel in accordance with an exemplary embodiment of the present disclosure.
Figure 31B:
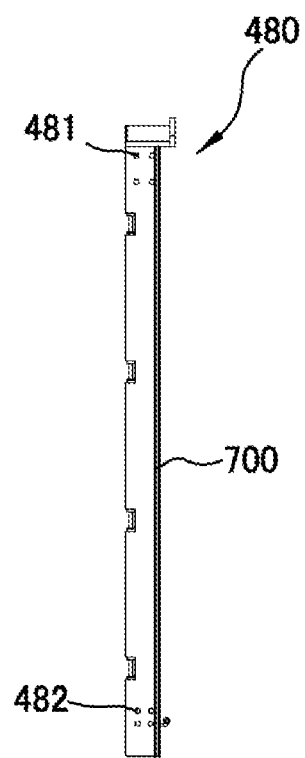
Figure 32:
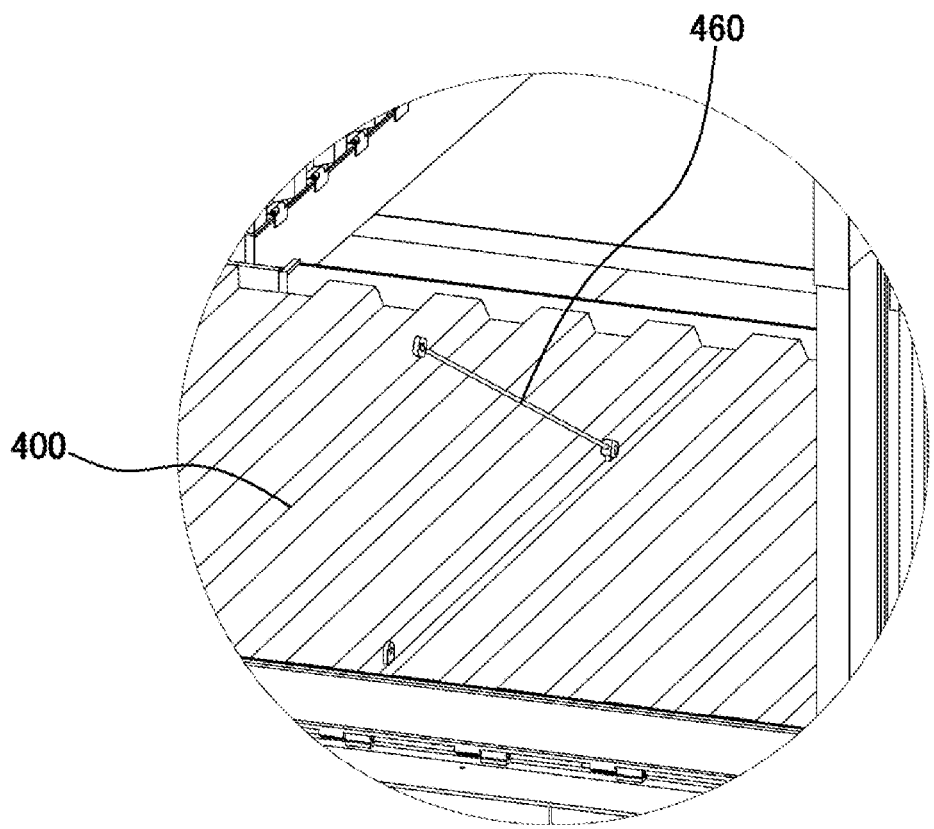
FIG. 32 is a diagram provided to explain a rod bar in accordance with an exemplary embodiment of the present disclosure.
Figure 33:
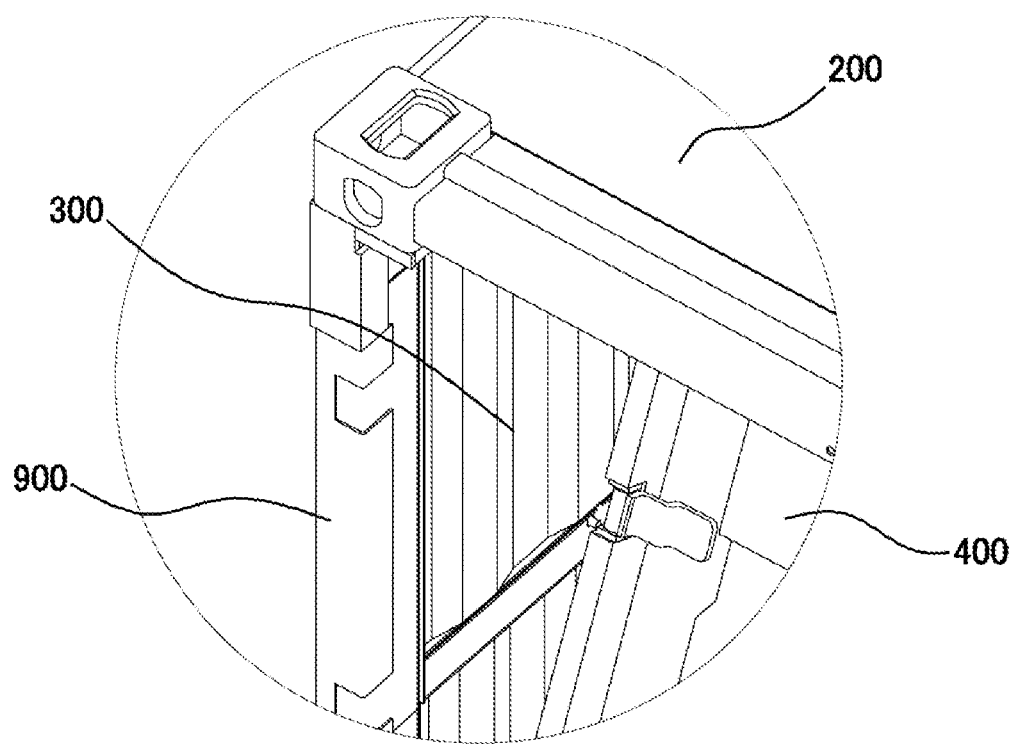
FIG. 33 is a diagram provided to explain a panel connection unit in accordance with an exemplary embodiment of the present disclosure.
Figure 34:
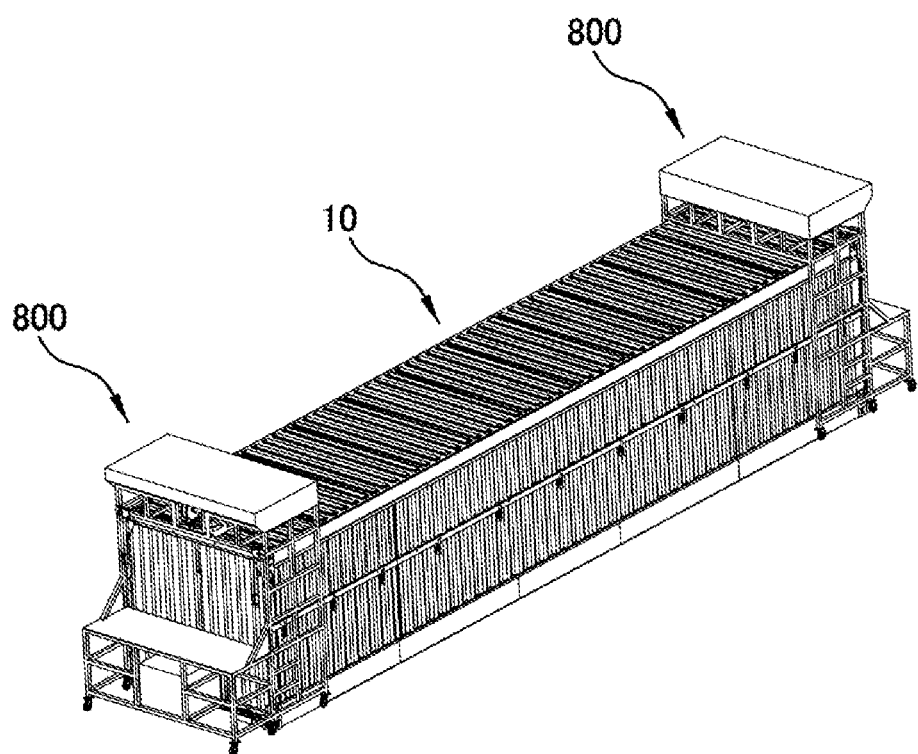
FIG. 34 to FIG. 36 are diagrams provided to explain a method of folding the foldable container in accordance with an exemplary embodiment of the present disclosure.
Figure 35:
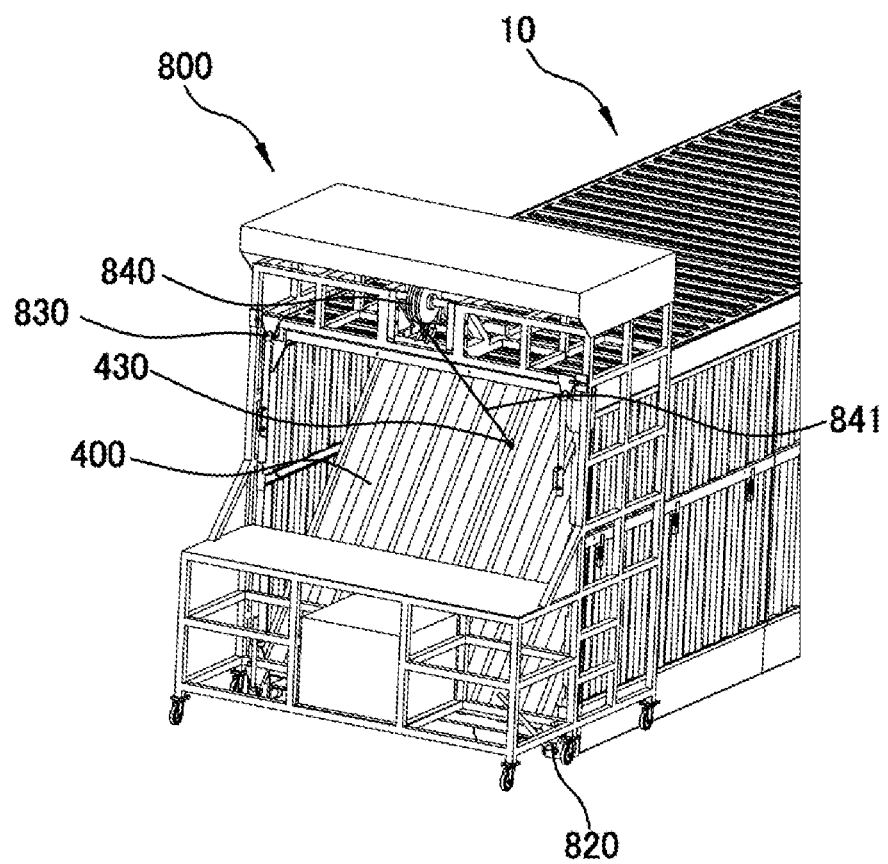
Figure 36:
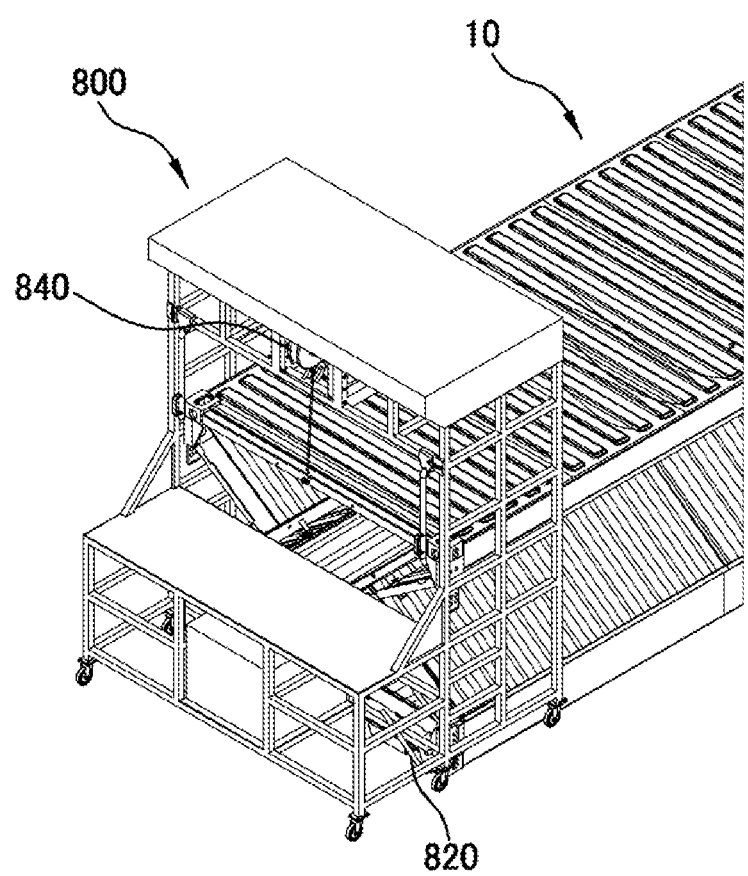
Figure 37:
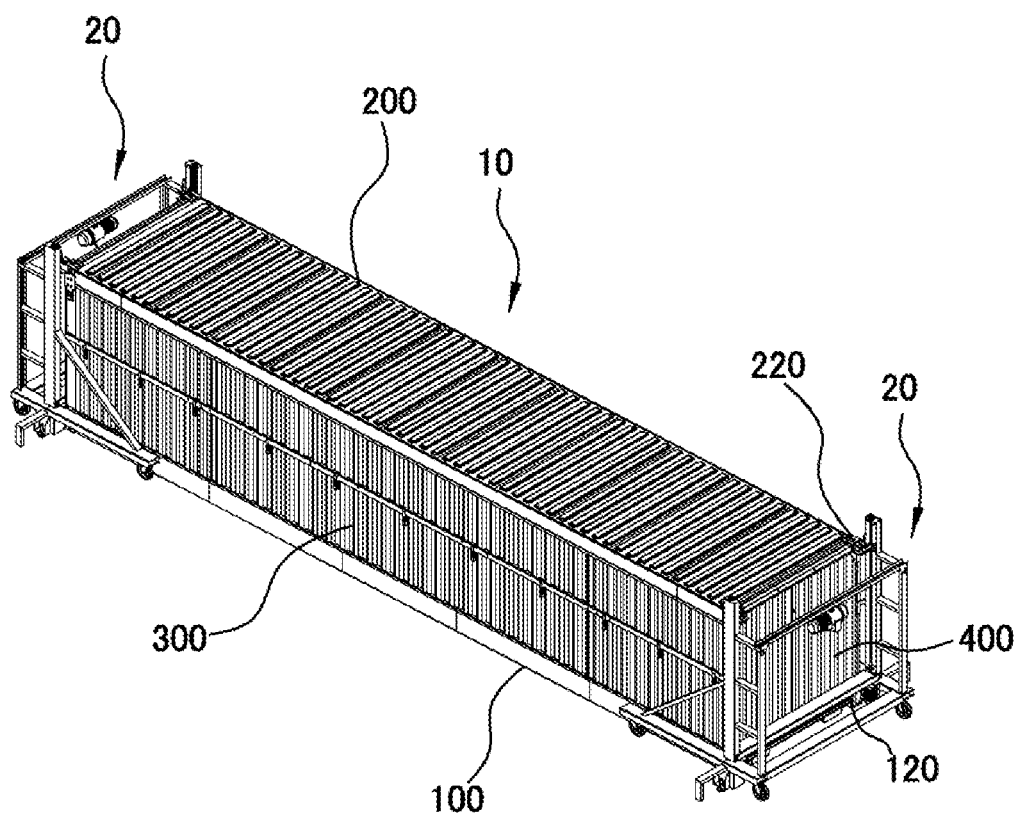
FIG. 37 is a diagram illustrating a status where an apparatus for folding and unfolding a foldable container is installed on the foldable container in accordance with an exemplary embodiment of the present disclosure.
Figure 38:
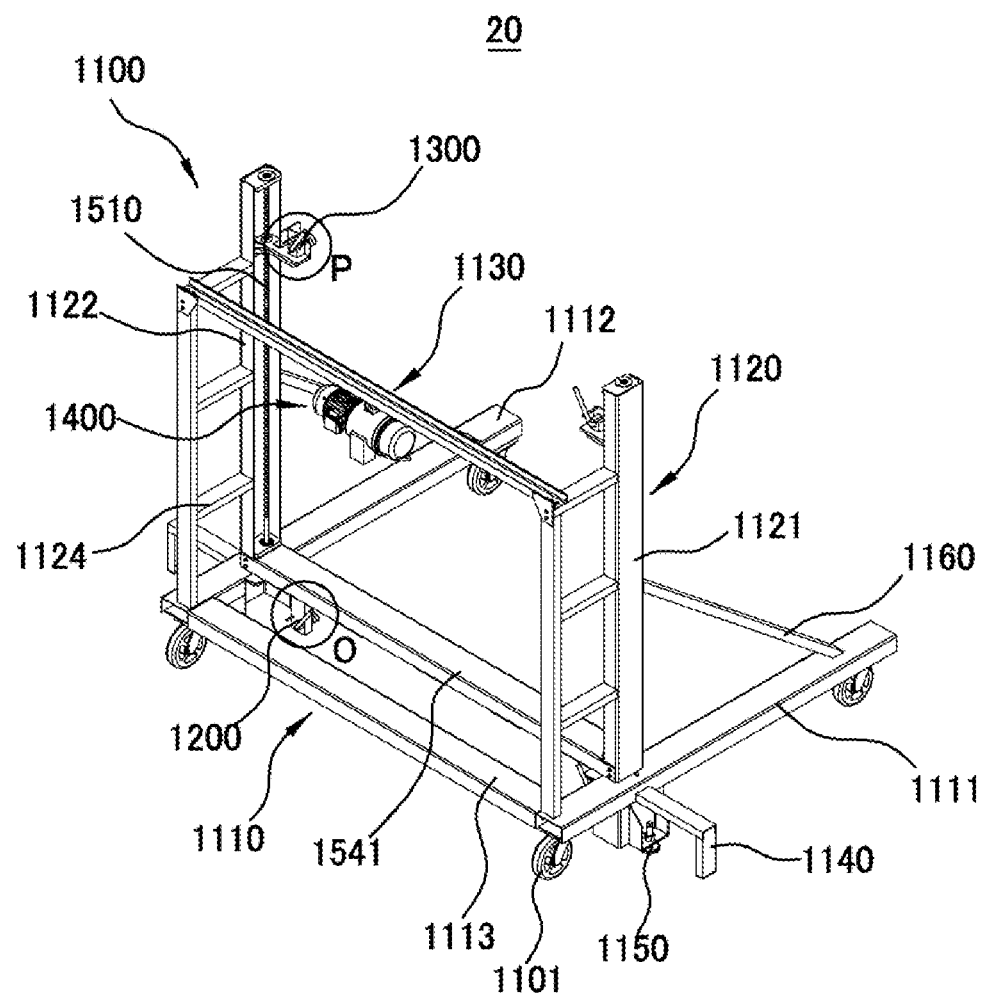
FIG. 38 is a perspective view of an apparatus for folding and unfolding a foldable container in accordance with an exemplary embodiment of the present disclosure.
Figure 39:
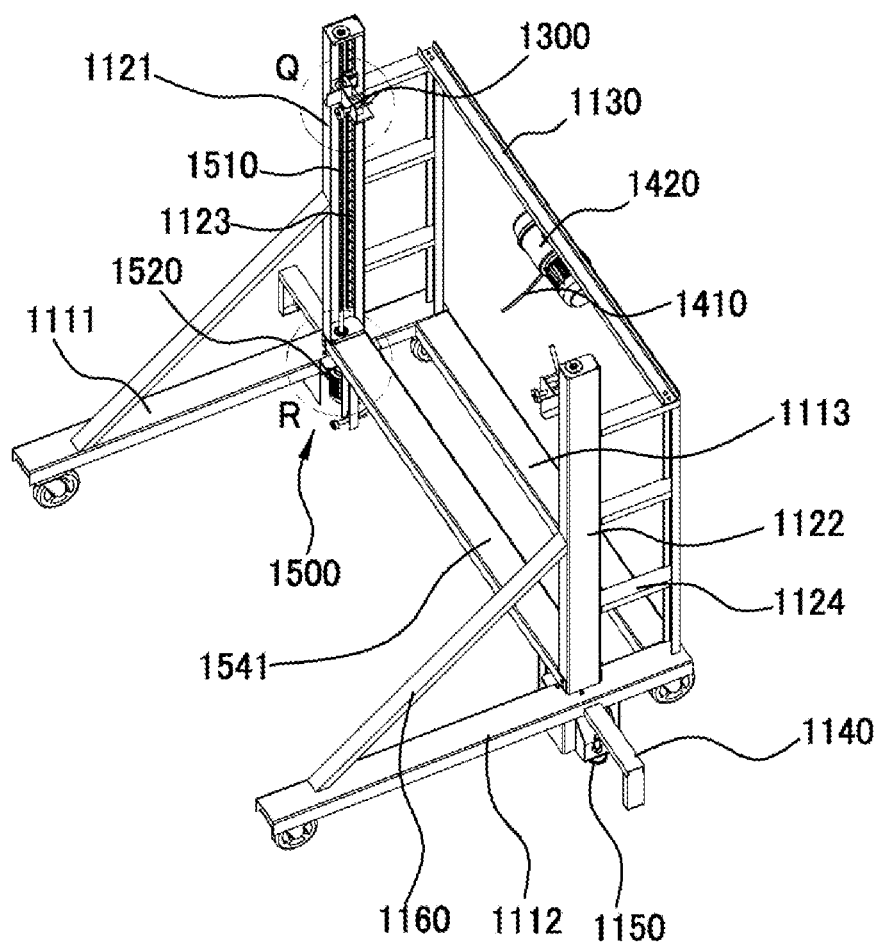
FIG. 39 is a rear perspective view of the apparatus for folding and unfolding a foldable container in accordance with an exemplary embodiment of the present disclosure.
Figure 40A:
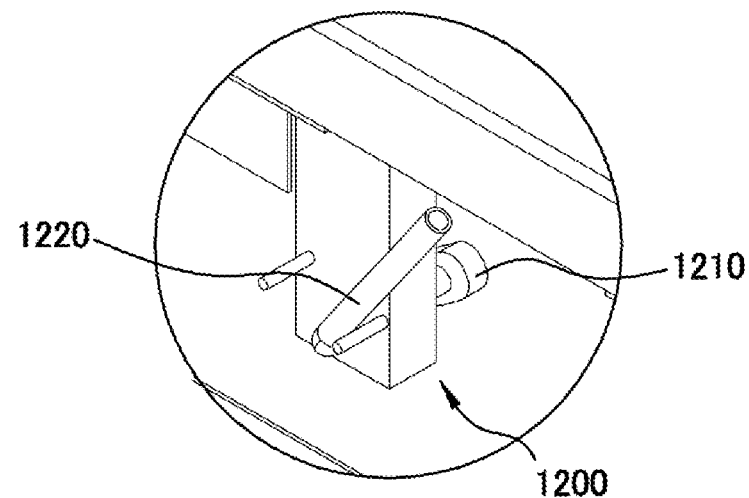
FIG. 40A provides enlarged views of portions O in FIG. 38 and FIG. 40B provides enlarged views of portions P in FIG. 38.
Figure 40B:
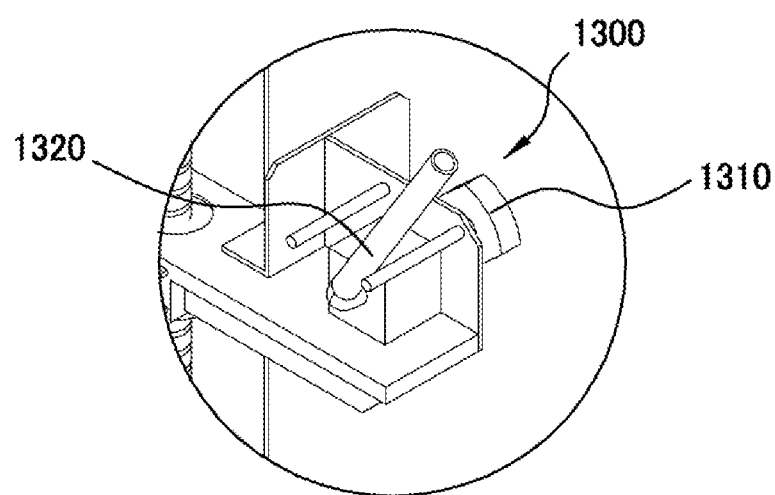
Figure 41A:
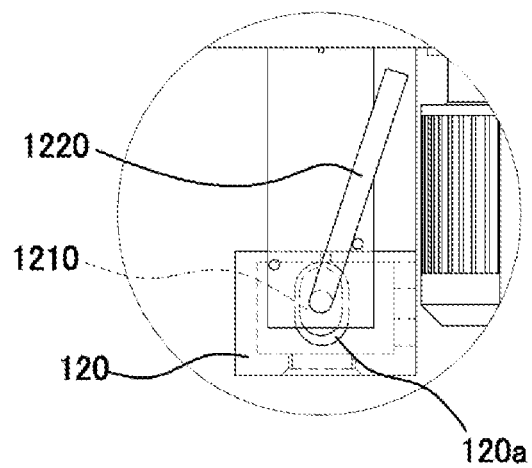
FIGS. 41A and 41B provide diagrams to explain an operation of a lower fixing unit in accordance with an exemplary embodiment of the present disclosure.
Figure 41B:
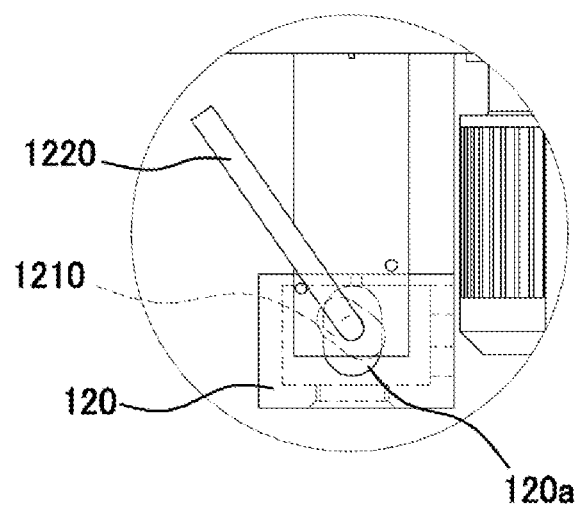
Figure 42A:
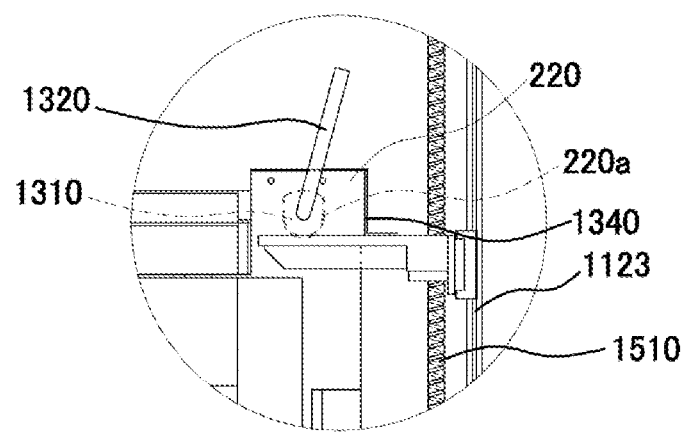
FIGS. 42A and 42B provide diagrams to explain an operation of an upper fixing unit in accordance with an exemplary embodiment of the present disclosure.
Figure 42B:
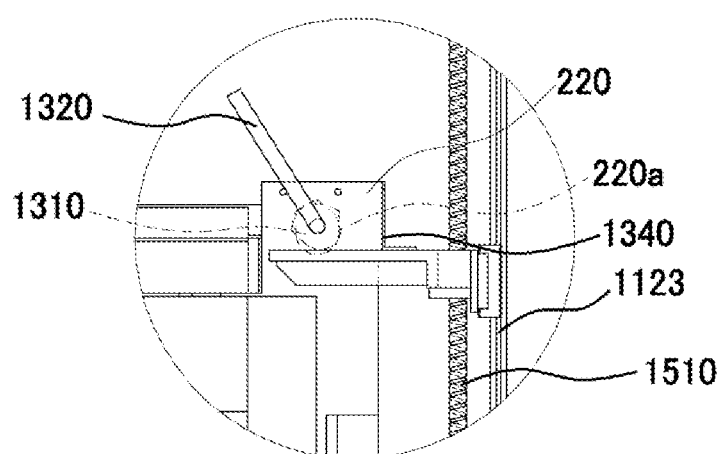
Figure 43A:
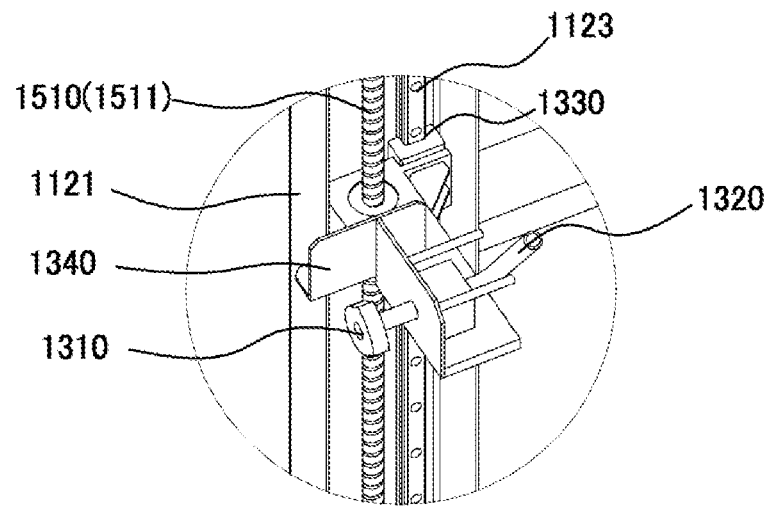
FIG. 43A provides enlarged views of a portion Q in FIG. 39 and FIG. 43B a diagram provided to explain a LM guide unit in accordance with an exemplary embodiment of the present disclosure.
Figure 43B:
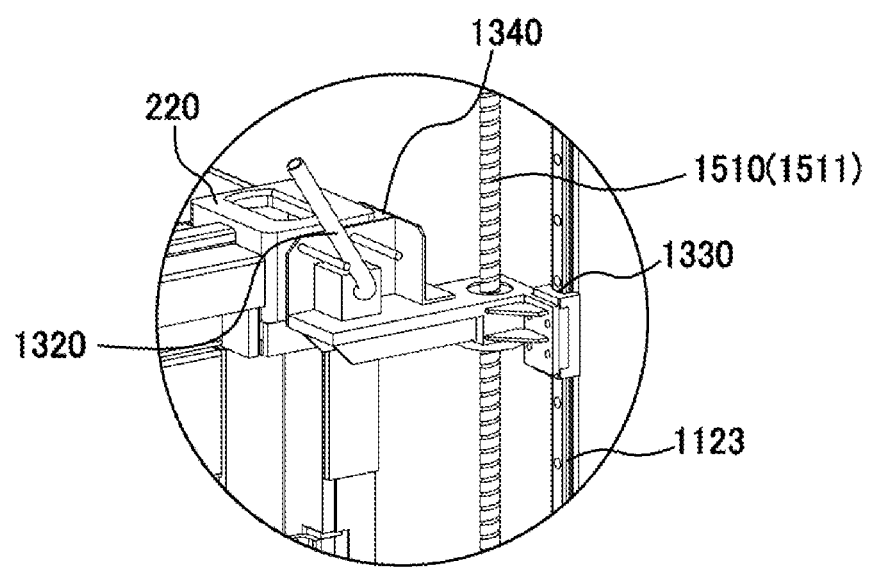
Figure 44:
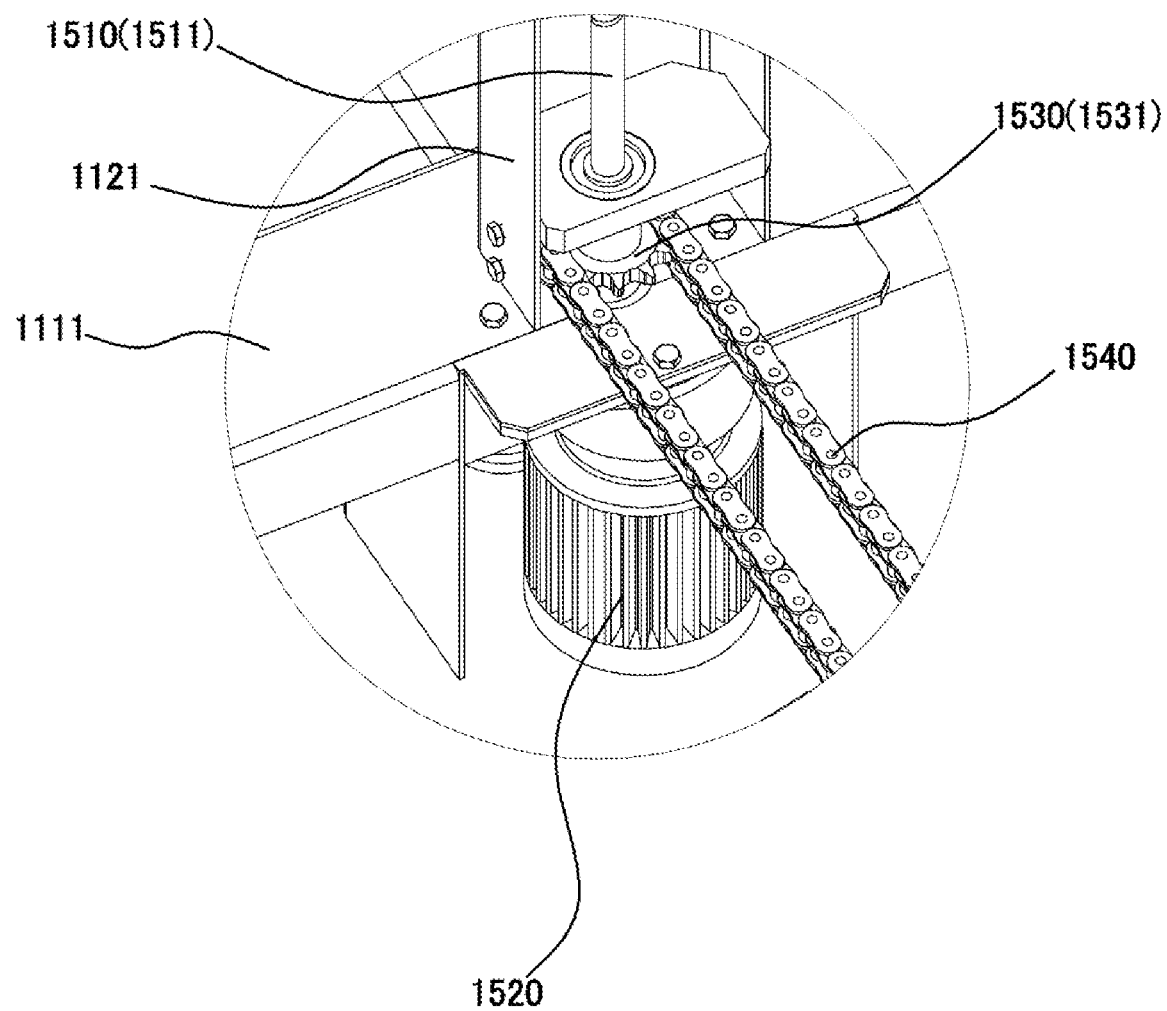
FIG. 44 is an enlarged view of a portion R in FIG. 39.
Figure 45:
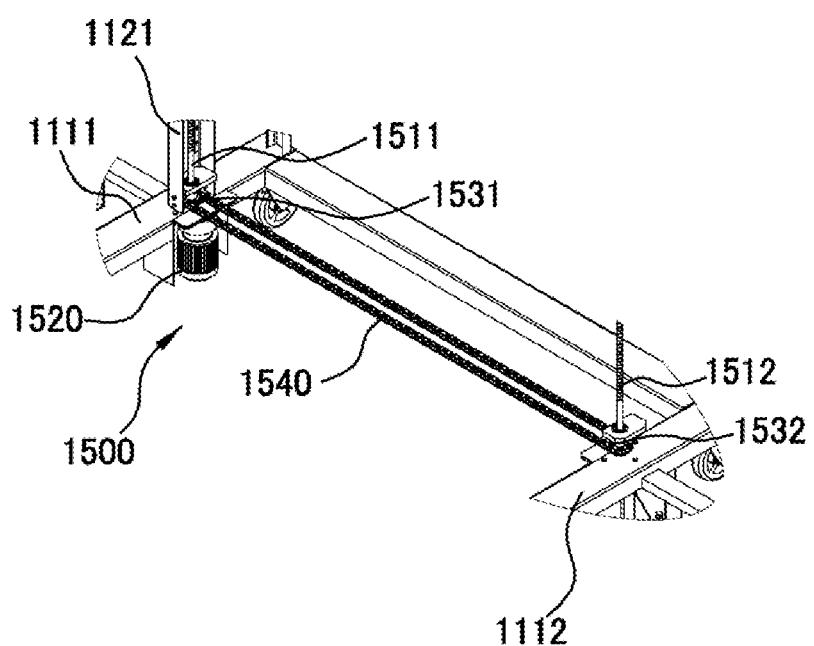
FIG. 45 is a diagram provided to explain an up/down folding/unfolding unit in accordance with an exemplary embodiment of the present disclosure.
Figure 46:
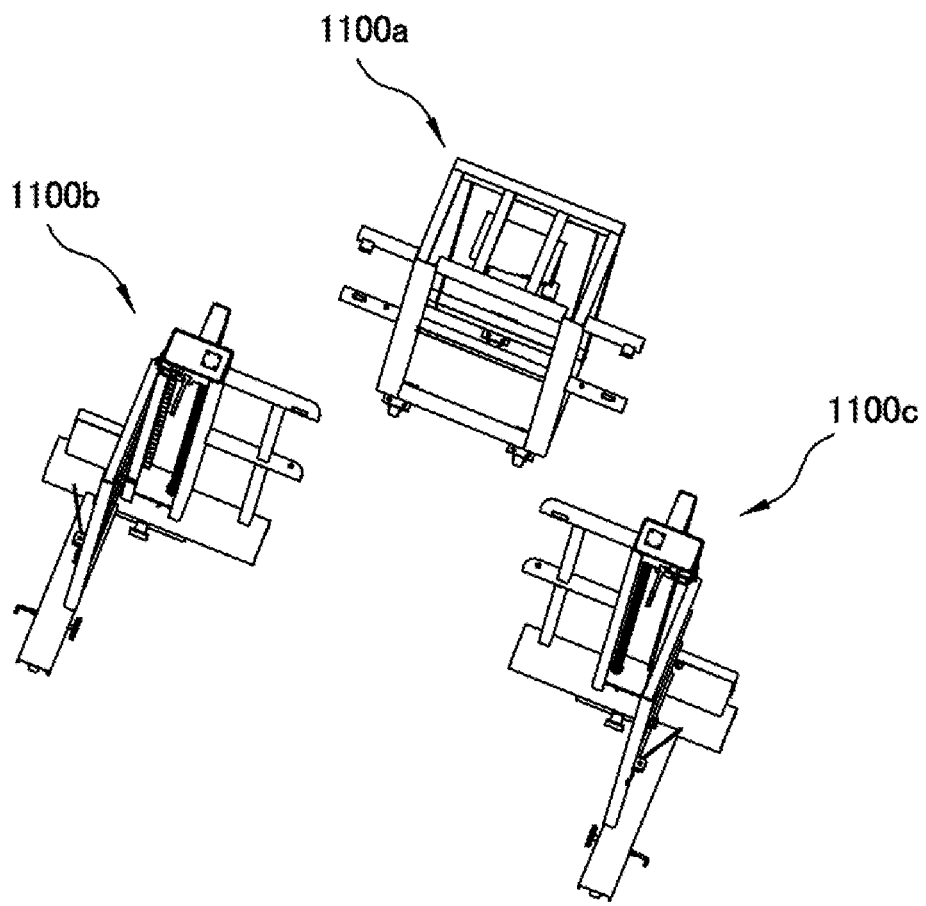
FIG. 46 and FIG. 47 are diagrams provided to explain a main body in accordance with an exemplary embodiment of the present disclosure.
Figure 47:
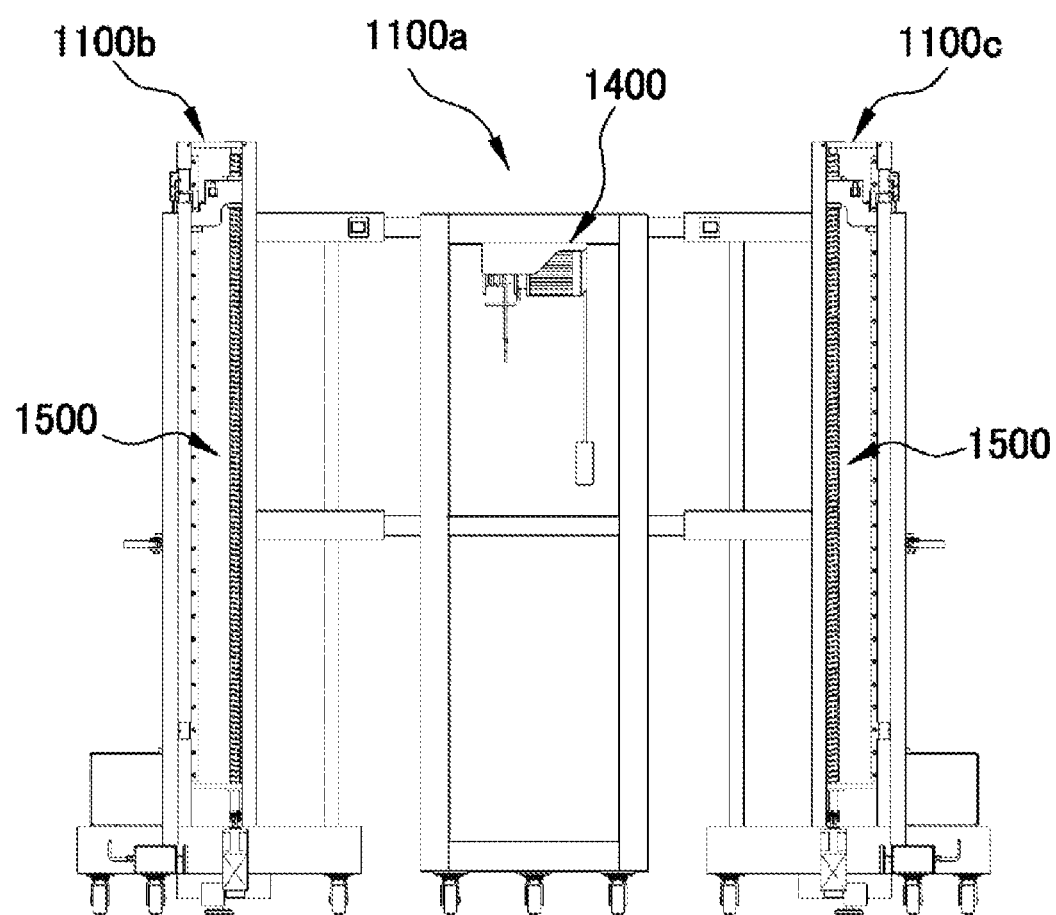
Figure 48:
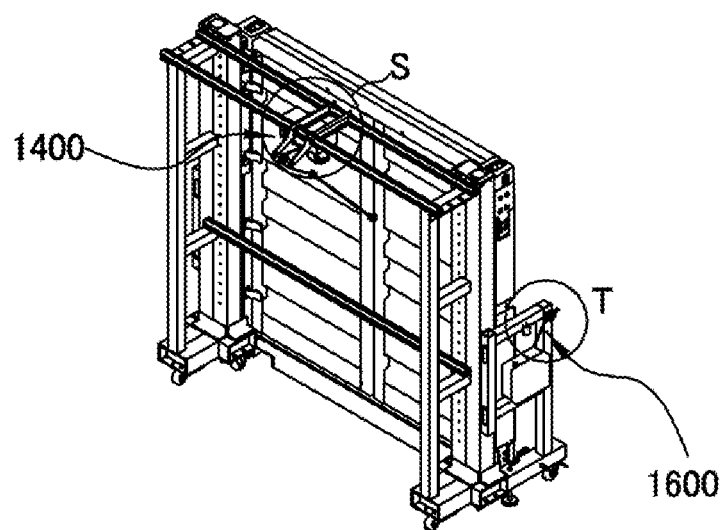
FIG. 48 to FIG. 50 are diagrams provided to explain a pulley and a lateral side fixing unit in accordance with an exemplary embodiment of the present disclosure.
Figure 49:
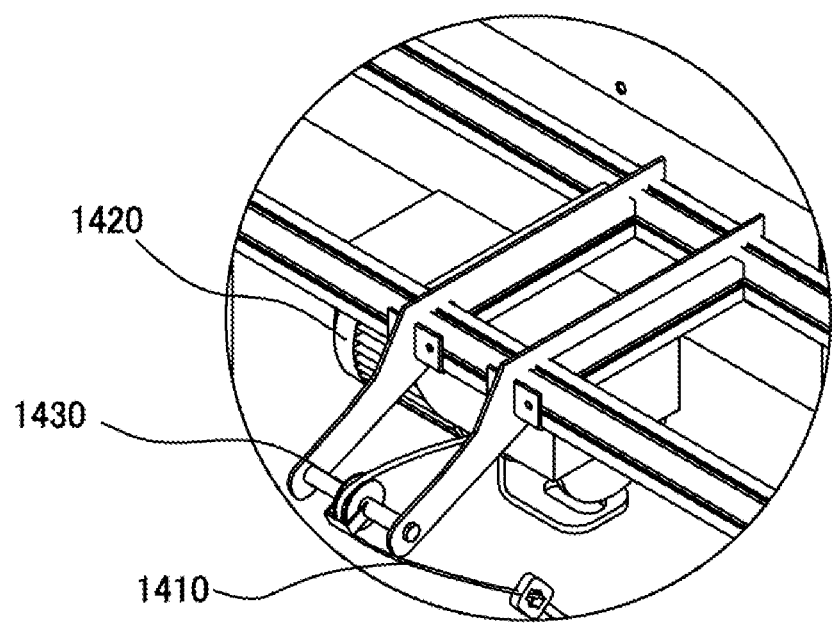
Figure 50:
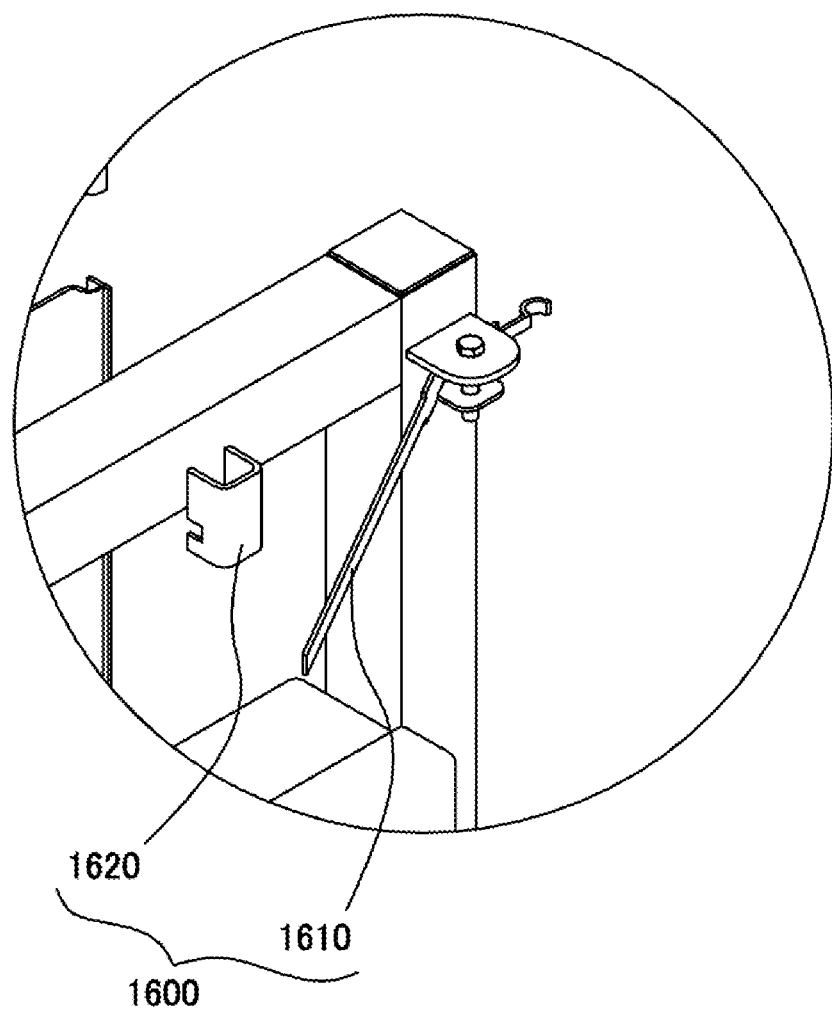
Figure 51:
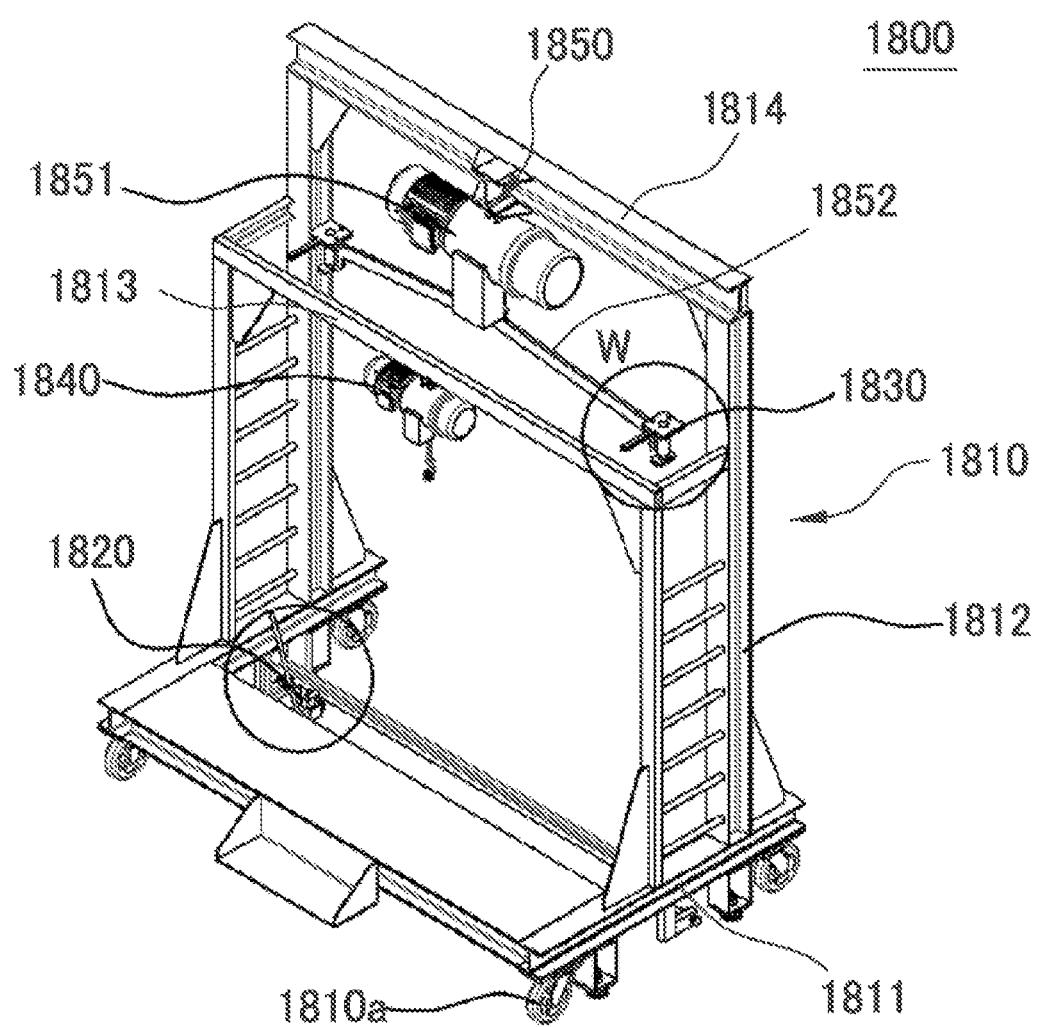
FIG. 51 is a perspective view of an apparatus for folding and unfolding a foldable container in accordance with another exemplary embodiment of the present disclosure.
Figure 52:
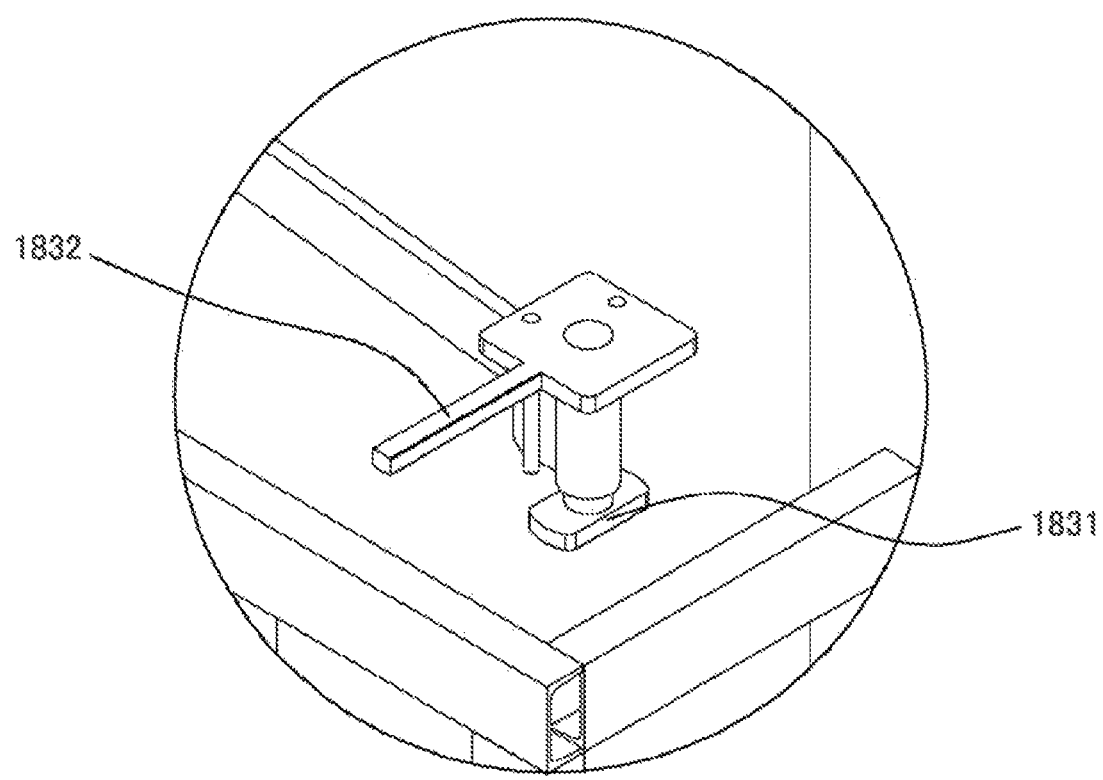
FIG. 52 is an enlarged view of a portion W in FIG. 51.
Figure 53:
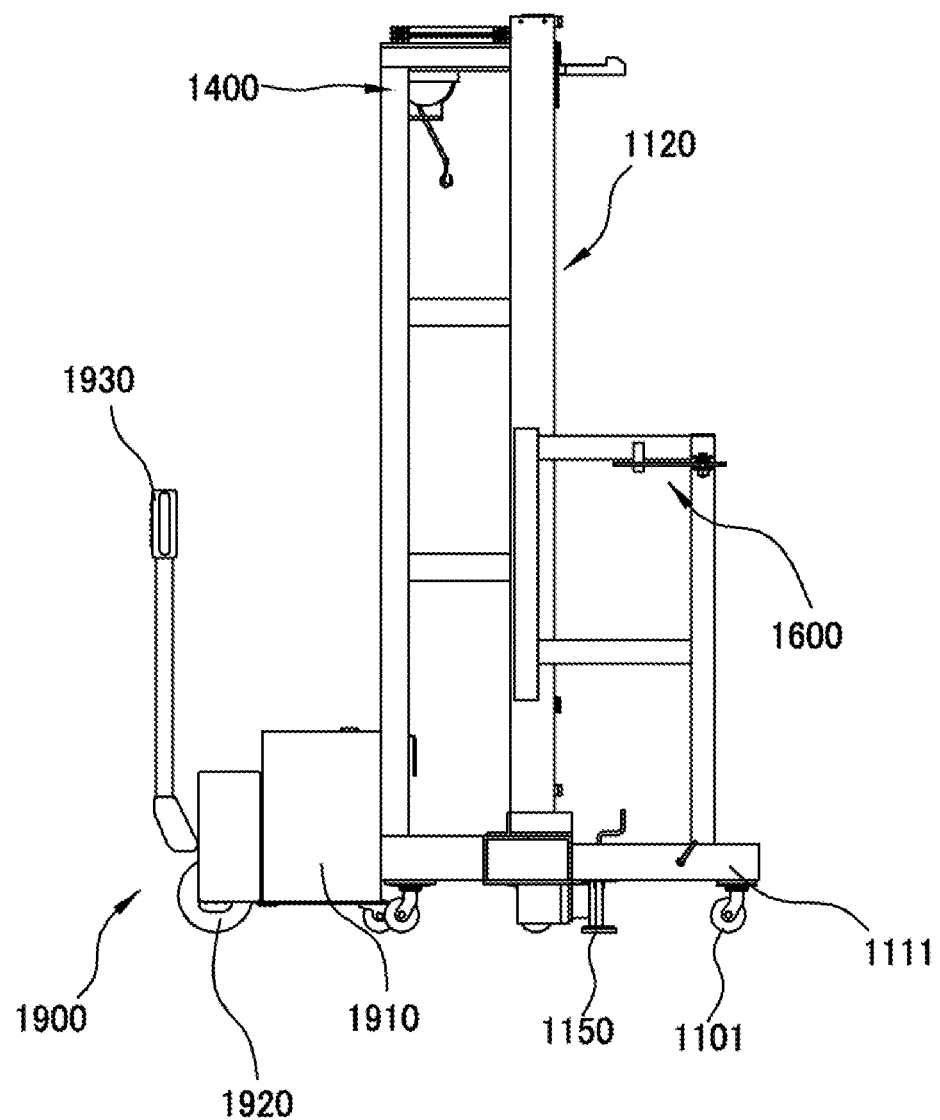
FIG. 53 is a side view illustrating the apparatus for folding and unfolding a foldable container to which an operation unit is added in accordance with another exemplary embodiment of the present disclosure.
Figure 54:
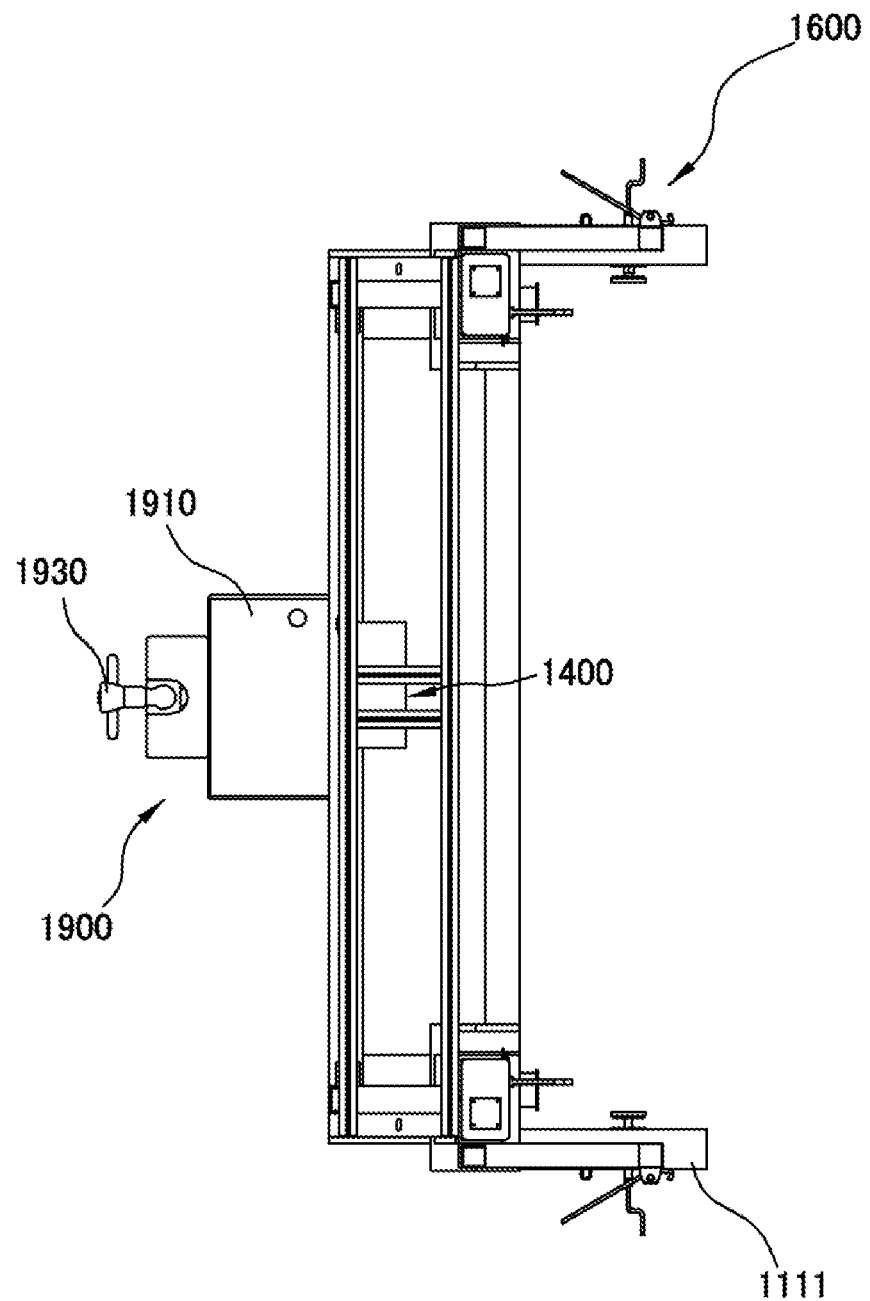
FIG. 54 is a plan view illustrating the apparatus for folding and unfolding a foldable container to which the operation unit is added in accordance with another exemplary embodiment of the present disclosure.
Figure 59:
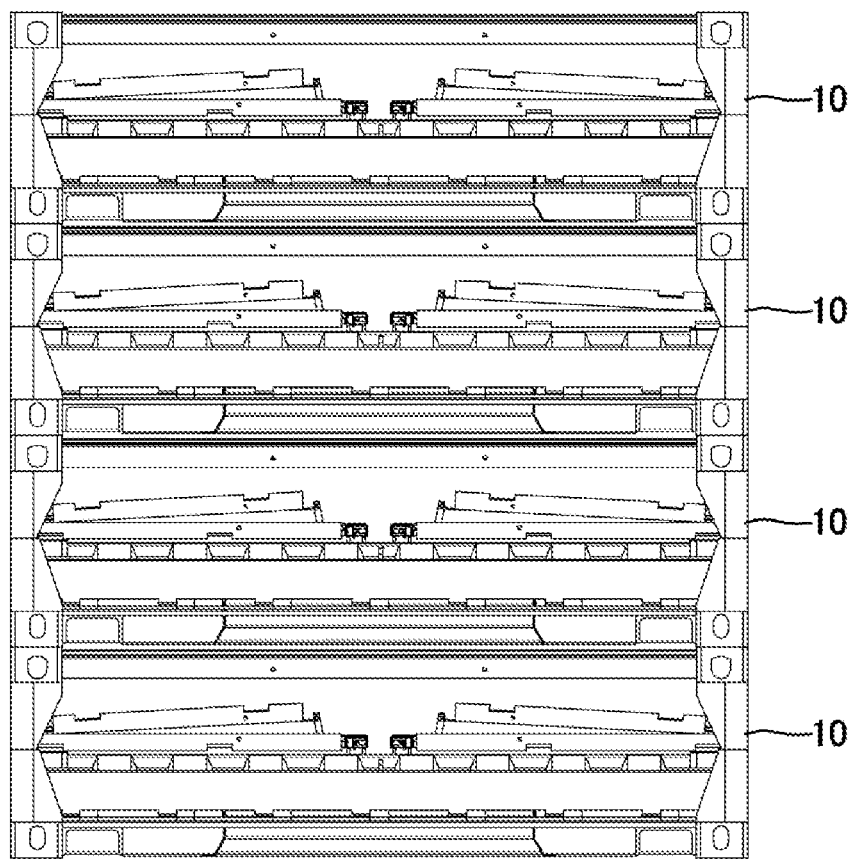
FIG. 59 is a diagram illustrating a status where multiple folded foldable containers are stacked in accordance with an exemplary embodiment of the present disclosure.

FIG. 1 is a perspective view of a foldable container in accordance with an exemplary embodiment of the present disclosure, FIG. 2 is a side view of the foldable container in accordance with an exemplary embodiment of the present disclosure, FIG. 3A, FIG. 3B and FIG. 4 are enlarged views of a portion A in FIG. 1 and exemplary operation diagrams of a sliding joint in accordance with an exemplary embodiment of the present disclosure, FIGS. 5A and 5B provide a partially enlarged view and a partial cross-sectional view of a lower panel in accordance with an exemplary embodiment of the present disclosure, FIGS. 6A and 6B provide exemplary operation diagrams of a cover portion in accordance with an exemplary embodiment of the present disclosure, FIGS. 7A and 7B provides diagrams illustrating a hinge portion of a front panel in accordance with an exemplary embodiment of the present disclosure, FIGS. 8A and 8B provide a partial perspective view and a partially see-through view of a lower edge of the foldable container in accordance with an exemplary embodiment of the present disclosure, FIG. 9 is a diagram provided to illustrate an operating of folding a front panel illustrated in FIG. 8, FIG. 10 is a diagram provided to explain a locking device storage unit in accordance with an exemplary embodiment of the present disclosure, FIGS. 11A and 11B are a diagram provided to explain a configuration for fixing a front panel and a rear panel to an upper panel in accordance with an exemplary embodiment of the present disclosure, FIGS. 12A and 12B are a diagram provided to explain a configuration for fixing a front panel and a rear panel to an upper panel in accordance with another exemplary embodiment of the present disclosure, FIG. 13A is a side view of a configuration fixed by the front panel and the rear panel illustrated in FIGS. 11A and 11B and FIG. 13B is a side view of a configuration fixed by the front panel and the rear panel illustrated in and FIGS. 12A and 12B, FIGS. 14A and 14B are a diagram provided to explain a member for fixing a lateral panel in accordance with an exemplary embodiment of the present disclosure, FIG. 15 is a partial cross-sectional perspective view of the foldable container in accordance with an exemplary embodiment of the present disclosure, FIGS. 16a and 16B are an enlarged view of a portion D in FIG. 15, FIGS. 17A and 17B provide exemplary operation diagrams of a lateral panel supporting unit in accordance with an exemplary embodiment of the present disclosure, FIGS. 18A and 18B provide enlarged views of portions B and C in FIG. 1, FIG. 19 is a diagram provided to explain an upper reinforcing piece and a lower reinforcing piece in accordance with an exemplary embodiment of the present disclosure, FIG. 20 is a side view of the foldable container in accordance with an exemplary embodiment of the present disclosure, FIG. 21A is a cross-sectional view taken along a line E-E' in FIG. 20 and FIG. 21B is a cross-sectional view taken along a line F-F' in FIG. 20, FIGS. 22A and 22B provide enlarged views of portions G and H in FIG. 21A, FIGS. 23A and 23B provides enlarged views of portions I and J in FIG. 21B, FIG. 24 is a cross-sectional perspective view taken along a line E-E' in FIG. 20, FIG. 25A is an enlarged view of a portion K in FIG. 24 and FIG. 25B is a diagram provided to explain a fixing member of a lower lateral panel, FIGS. 26A and 26B provides cross-sectional views of the foldable container in accordance with an exemplary embodiment of the present disclosure, FIG. 27A provides enlarged views of a portion L in FIG. 26A and FIG. 27B provides enlarged views of a portion L in FIG. 26B, FIG. 28A provides enlarged views of a portion M in FIG. 26A and FIG. 28B provides enlarged views of a portion M in FIG. 26B, FIG. 29A provides enlarged views of a portion N in FIG. 26A and FIG. 29B provides enlarged views of a portion N in FIG. 26B, FIGS. 30A and 30B provide diagrams to explain a panel connection protection unit in accordance with an exemplary embodiment of the present disclosure, FIG. 31A provides a perspective view of a frame of a front panel in accordance with an exemplary embodiment of the present disclosure and FIG. 31B provides a side view of a frame of a front panel in accordance with an exemplary embodiment of the present disclosure, FIG. 32 is a diagram provided to explain a rod bar in accordance with an exemplary embodiment of the present disclosure, FIG. 33 is a diagram provided to explain a panel connection unit in accordance with an exemplary embodiment of the present disclosure, FIG. 34 to FIG. 36 are diagrams provided to explain a method of folding the foldable container in accordance with an exemplary embodiment of the present disclosure, FIG. 37 is a diagram illustrating a status where an apparatus for folding and unfolding a foldable container is installed on the foldable container in accordance with an exemplary embodiment of the present disclosure, FIG. 38 is a perspective view of an apparatus for folding and unfolding a foldable container in accordance with an exemplary embodiment of the present disclosure, FIG. 39 is a rear perspective view of the apparatus for folding and unfolding a foldable container in accordance with an exemplary embodiment of the present disclosure, FIG. 40A provides enlarged views of portions O in FIG. 38 and FIG. 40B provides enlarged views of portions P in FIG. 38, FIGS. 41A and 41B provides diagrams to explain an operation of a lower fixing unit in accordance with an exemplary embodiment of the present disclosure, FIGS. 42A and 42B provide diagrams to explain an operation of an upper fixing unit in accordance with an exemplary embodiment of the present disclosure, FIG. 43A provides enlarged views of a portion Q in FIG. 39 and FIG. 43B a diagram provided to explain a LM guide unit in accordance with an exemplary embodiment of the present disclosure, FIG. 44 is an enlarged view of a portion R in FIG. 39, FIG. 45 is a diagram provided to explain an up/down folding/unfolding unit in accordance with an exemplary embodiment of the present disclosure, FIG. 46 and FIG. 47 are diagrams provided to explain a main body in accordance with an exemplary embodiment of the present disclosure, FIG. 48 to FIG. 50 are diagrams provided to explain a pulley and a lateral side fixing unit in accordance with an exemplary embodiment of the present disclosure, FIG. 51 is a perspective view of an apparatus for folding and unfolding a foldable container in accordance with another exemplary embodiment of the present disclosure, FIG. 52 is an enlarged view of a portion W in FIG. 51, FIG. 53 is a side view illustrating the apparatus for folding and unfolding a foldable container to which an operation unit is added in accordance with another exemplary embodiment of the present disclosure, FIG. 54 is a plan view illustrating the apparatus for folding and unfolding a foldable container to which the operation unit is added in accordance with another exemplary embodiment of the present disclosure, FIG. 55 to FIG. 58B are diagrams provided to explain a method of folding and unfolding a foldable container using the apparatus for folding and unfolding a foldable container in accordance with an exemplary embodiment of the present disclosure, and FIG. 59 is a diagram illustrating a status where multiple folded foldable containers are stacked in accordance with an exemplary embodiment of the present disclosure.

Firstly, a foldable container 10 according to an exemplary embodiment of the present disclosure (hereinafter, referred to as "present foldable container 10") will be described.

Referring to FIG. 1, FIG. 7A and FIG. 7B, the present foldable container 10 includes a lower panel 100, an upper panel 200 provided in parallel with the lower panel 100, first and second lateral panels 301 and 302 of which upper and lower ends are respectively connected to the upper panel 200 and the lower panel 100 to be rotatable along a longitudinal direction of the upper panel 200 and the lower panel 100 and which are configured to be folded toward the inside of the foldable container 10, and a front panel 400 and a rear panel 500 connected to the lower panel 100 to be rotatable along a transverse direction of the lower panel 100.

The longitudinal direction may refer to the 8 o'clock direction and the 2 o'clock direction in FIG. 1, and the transverse direction may refer to the 4 o'clock direction and the 10 o'clock direction in FIG. 1.

Further, the first lateral panel 301 and the second lateral panel 302 are positioned on lateral sides, respectively, between the upper panel 200 and the lower panel 100 and include the same components and are symmetrically provided. Therefore, the first lateral panel 301 and the second lateral panel 302 will not be separately described, but will be referred to and described as a lateral panel 300.

Referring to FIG. 2, the lateral panel 300 includes an upper lateral panel 310 hinge-connected to the upper panel 200, a lower lateral panel 320 positioned under the upper lateral panel 310 and hinge-connected to the lower panel 100, and one or more sliding joints 330 connecting the upper lateral panel 310 and the lower lateral panel 320.

The upper lateral panel 310 may be hinge-connected to the upper panel 200 to be rotatable. For example, at least one hinge portion 310a of the upper lateral panel 310 may be positioned at an edge of an upper inside of the upper lateral panel 310 and the hinge portion 310a of the upper lateral panel 310 may be connected to a longitudinal lower part of the upper panel 200, and the upper lateral panel 310 may be folded by being rotated toward the inside of the foldable container 10 around the hinge portion 310a of the upper lateral panel 310. The inside may refer to a space in the foldable container 10 where freight is loaded.

The lower lateral panel 320 may be positioned under the upper lateral panel 310 and a lower part thereof may be hinge-connected to the lower panel 100 to be rotatable. For example, at least one hinge portion 320a of the lower lateral panel 320 may be positioned at an edge of a lower inside of the lower lateral panel 320 and the hinge portion 320a of the lower lateral panel 320 may be connected to a longitudinal upper part of the lower panel 100, and the lower lateral panel 320 may be folded by being rotated toward the inside of the foldable container 10 around the hinge portion 320a of the lower lateral panel 320.

Further, as the upper panel 200 is moved upwards by a container folding/unfolding apparatus 20 to be described later, the upper lateral panel 310 is moved upwards a predetermined distance and then the lateral panel 300 is folded. To this end, the upper lateral panel 310 and the lower lateral panel 320 are connected by one or more sliding joints 330.

Hereinafter, the sliding joint 330 will be described in detail with reference to FIG. 3A, FIG. 3B and FIG. 4.

The sliding joint 330 includes a first fixing unit 331 connected to the upper lateral panel 310, a second fixing unit 332 connected to the lower lateral panel 320, and a link unit 333 of which one side is hinge-connected to the first fixing unit 331 and the other side is hinge-connected to the second fixing unit 332 to be slidable.

For example, an upper part of the first fixing unit 331 may be connected to a lower part of an outer surface of the upper lateral panel 310 and a lower part of the first fixing unit 331 may be hinge-connected to an upper part of the link unit 333.

Further, the second fixing unit 332 may be connected to an upper part of an outer surface of the lower lateral panel 320 and an upper part of the second fixing unit 332 may be connected to a lower part of the link unit 333.

Herein, the upper part of the second fixing unit 332 may include a sliding dent 332a which is dented for the link unit 333 to be inserted therein, and a sliding groove 332b having a predetermined length in a vertical direction may be formed outwards in each of inner surfaces of the sliding dent 332a.

Further, the upper part of the link unit 333 may be hinge-connected to the lower part of the first fixing unit 331 and a sliding pine 333a may be positioned on the lower part thereof, and the sliding pin 333a may be inserted into the sliding groove 332b and then connected to the second fixing part 332 to be movable and rotatable in a vertical direction along the sliding groove 332b.

In other words, referring to FIG. 3B, to fold the lateral panel 300, the upper lateral panel 310 is moved upwards a predetermined distance and the link unit 333 is moved upwards the same distance along the sliding groove 332b accordingly. Further, referring to FIG. 4, if the lateral panel 300 is folded toward the inside of the foldable container 10, the link unit 333 is moved toward an inner lower part of the foldable container 10 at the same time when the lower part of the first fixing unit 331 and the upper part of the second fixing unit 332 are hinge-connected to the upper part and the lower part of the link unit 333, respectively, and, thus, the upper lateral panel 310 and the lower lateral panel 320 can be folded.

The lower panel 100 in accordance with an exemplary embodiment of the present disclosure will be described with reference to FIG. 5A, FIG. 5B, FIG. 6A and FIG. 6B.

On each of a front end and a rear end of an upper surface of the lower panel 100, a step portion 110 which is stepped lower than the upper surface of the lower panel 100 may be formed.

The step portion 110 may include a step surface 111 formed in parallel with the upper surface of the lower panel 100 and a step sill surface 112 formed perpendicularly to the step surface 111 and connected to the upper surface and the step surface 111.

Further, the lower panel 100 may include a cover portion 140 which can cover the step portion 110 of the lower panel 100.

For example, hinge portions 141 of the cover portion 140 the cover portion 140 may be positioned at both ends of the cover portion 140 in a transverse direction and the hinge portions 141 of the cover portion 140 may be connected to the lateral panel 300 and rotated around an edge where the step sill surface 112 and the upper surface of the lower panel 100 meet, as illustrated in FIG. 5A, FIG. 5B, FIG. 6A and FIG. 6B. However, the cover portion 140 is not limited thereto and may be hinge-connected to an upper part of the step sill surface 112 and rotated around the edge where the step sill surface 112 and the upper surface of the lower panel 100 meet.

The front panel 400 and the rear panel 500 are positioned on a front side and a rear side, respectively, between the upper panel 200 and the lower panel 100 and include the same components and are symmetrically provided. Therefore, an explanation of the rear panel 500 will be omitted and only the front panel 400 will be explained.

Meanwhile, the front panel 400 may be manufactured in the form of a door and the rear panel 500 may be manufactured in the form of a wall.

The front panel 400 may be connected to be rotatable toward the inside of the foldable container 10.

The front panel 400 in accordance with an exemplary embodiment of the present disclosure will be described with reference to FIGS. 7A and 7B.

The front panel 400 may be hinge-connected to the step portion 110.

In other words, a hinge portion 420 of the front panel 400 is positioned at an inner lower edge thereof and the hinge portion 420 of the front panel 400 is positioned at the step portion 110 and the front panel 400 can be folded around the hinge portion 420 of the front panel 400 toward the inside of the foldable container 10.

In order to fold the front panel 400 toward the inside, the cover portion 140 is rotated first, and then the front panel 400 can be folded inwards.

Therefore, when the front panel 400 is hinge-connected to the step portion 110 and thus folded toward the inside of the foldable container 10, the front panel 400 can be folded without interference in a bottom surface of the lower panel 100 and a step with respect to the upper surface of the lower panel 100 can be eliminated and the introduction of external foreign materials into the foldable container 10 can be suppressed while a door in the front panel 400 is maintained in size.

Further, since the step portion 110 is covered using the cover portion 140, the hinge portion 420 of the front panel 400 is not exposed to the outside but formed flat without unevenness on the upper surface of the lower panel 100.

The front panel 400 and the rear panel 500 include rings 430 on their upper part, and, thus, the front panel 400 and the rear panel 500 can be rotated to be folded and unfolded by connecting a wire of the container folding/unfolding apparatus 20 to be described later to the rings 430.

In another exemplary embodiment, referring to FIG. 32, the front panel 400 and the rear panel 500 may further include a rod bar 460 connected to their upper part.

Specifically, one end of the rod bar 460 may be connected to the upper part of the front panel 400 or rear panel 500 to be rotatable and the other end thereof may be connected to the wire of the container folding/unfolding apparatus 20. Thus, a worker can connect the wire for rotating the front panel 400 or rear panel 500 to the other end of the rod bar 460 without entering the foldable container 10. Therefore, it is possible to suppress the risk of safety accident.

The front panel 400 in accordance with another exemplary embodiment of the present disclosure will be described with reference to FIG. 8A, FIG. 8B and FIG. 9.

The front panel 400 includes a rotation protrusion 450 on a lower part of a lateral frame and a rotation recession 321 formed on an inner surface of the lateral panel 300, and, thus, the rotation protrusion 450 can be connected to the rotation recession 321 by being inserted into the rotation recession 321 to be rotatable.

More specifically, the front panel 400 includes the rotation protrusion 450 on the lower part of the lateral frame, and the rotation recession 321 into which the rotation protrusion 450 is inserted is dented to have a "⋀" shape on the inner surface of the lateral panel 300, and if the front panel 400 is folded, the rotation protrusion 450 can be moved upwards within the rotation recession 321 and then the front panel 400 can be folded.

Referring to FIG. 10, the step surface 111 of the lower panel 100 may include a locking device storage unit 111a which is dented downwards and configured to store a container locking device capable of connecting edges of the foldable container 10.

For example, the locking device storage unit 111a is a place to store a device connecting the container 10 and the container 10 and is dented downwards on the step surface 111 and divided by partitions to store multiple container locking devices. Further, as illustrated in FIG. 10, the locking device storage unit 111a may store four container locking devices therein to connect the respective edges of the foldable container 10, but is not limited thereto and may store multiple locking devices therein.

A configuration in which the front panel 400 is fixed to the upper panel 200 will be described with reference to FIG. 11A to FIG. 13B.

Referring to FIGS. 11A and 11B, the front panel may include a protrusion 410 protruded on an upper surface of an upper frame of the front panel 400, and the upper panel 20 may include a recession 210 positioned on a lower surface of a transverse frame of the upper panel 200 and dented for the protrusion 410 to be inserted therein.

The front panel 400 can be fixed without being folded toward the inside of the foldable container 10 since the protrusion 410 on the upper surface of the upper frame of the front panel 400 is inserted into the recession 210 on the lower surface of the transverse frame of the upper panel 200.

Further, if the front panel 400 is folded toward the inside of the foldable container 10, the upper panel 200 is moved upwards a predetermined distance and the protrusion 410 gets out of the recession 210 accordingly, and, thus, the front panel 400 can be folded.

In another exemplary embodiment, referring to FIGS. 12A and 12B, a recession 440 may be dented on the upper surface of the upper frame of the front panel 400 and a protrusion 240 may be protruded on the lower surface of the transverse frame of the upper panel 200.

Furthermore, referring to FIGS. 13A and 13B, the protrusions 240 and 410 may be formed into a cylindrical shape of which an upper edge is chamfered and thus can be easily inserted into the recessions 210 and 440.

A folding fixing unit 340 and a lateral panel reinforcing unit 350 will be described with reference to FIGS. 14A and 14B.

The folding fixing unit 340 can function to fix the upper lateral panel 310 and the lower lateral panel 320 not to be folded toward the inside of the foldable container 10 when the foldable container 10 is used. Further, one or more folding fixing units 340 may be provided.

Furthermore, the folding fixing unit 340 may be positioned on an inner side of the lateral panel, and, thus, it is possible to suppress the release of the folding fixing unit 340 from the outside and folding of the lateral panel 300.

The folding fixing unit 340 may include a screw unit 341 protruded inwards on a lower inner surface of the upper lateral panel 310, a screw insertion unit 342 of one-side open type formed on the lateral panel reinforcing unit 350 positioned on an upper part of the lower lateral panel 320, and a bolt 343 combined with the screw unit 341.

The one-side open type may refer to a "U" shape with an open top, so that the upper lateral panel 310 can be moved upwards even when the screw unit 341 is inserted.

When the foldable container 10 is used, the screw unit 341 is fixed to the lower inner surface of the upper lateral panel 310, and the screw unit 341 is inserted into the screw insertion unit 342 formed on the lateral panel reinforcing unit 350 positioned on the upper part of the lower lateral panel 320 and the bolt 343 is engaged with the screw unit 341, and, thus, an upper outer surface of the lower lateral panel 320 is closely fixed to the inner surface of the upper lateral panel 310. Therefore, the upper lateral panel 310 and the lower lateral panel 320 are not folded toward the inside of the foldable container 10. Further, when the foldable container 10 is folded, the upper lateral panel 310 and the lower lateral panel 320 can be folded by removing the bolt 343.

Further, the lateral panel reinforcing unit 350 may be positioned along a longitudinal direction between the upper lateral panel 310 and the lower lateral panel 320.

Furthermore, the lateral panel reinforcing unit 350 may support the upper lateral panel 310 hinge-connected to the upper panel 200 and enable the lateral panel 300 to be stably fixed together with the folding fixing unit 340.

For example, as illustrated in FIGS. 14A and 14B, the lateral panel reinforcing unit 350 may be connected to the upper part of the lower lateral panel 320 along a longitudinal direction as a member of which a cross-section has a "⊏" shape, but is not limited thereto, and may be connected thereto as a member having a "┐" shape, "⌡" shape, or "I" shape.

A lateral panel supporting unit 360 in accordance with an exemplary embodiment of the present disclosure will be described with reference to FIG. 15 to FIG. 17B.

A one end of the lateral panel supporting unit 360 may be hinge-connected to the upper part of the lower lateral panel 320 and when the lateral panel 300 is folded, the other end thereof may be in contact with the upper surface of the lower panel 100. Further, multiple lateral panel supporting units 360 may be provided along a longitudinal direction.

The lateral panel supporting unit 360 may be positioned within the lateral panel reinforcing unit 350 as illustrated in FIG. 16A, but is not limited thereto and may be positioned on the upper part of the lower lateral panel 320.

When the foldable container 10 is used, the lateral panel supporting unit 360 may be positioned not to protrude toward the inside of the lateral panel 300.

Further, when the foldable container 10 is folded, the lateral panel supporting unit 360 may be rotated around its one side to protrude in a direction perpendicular to the inner surface of the lateral panel 300. Herein, referring to FIGS. 17A and 17B, if the lateral panel 300 is fully folded, the other side of the lateral panel supporting unit 360 is in contact with the upper surface of the lower panel 100 and thus can support the weight of the lateral panel 300. With this configuration, it is possible to suppress deformation of the upper panel 200 or lateral panel 300 by weight.

An upper reinforcing piece 230 and a lower reinforcing piece 130 in accordance with an exemplary embodiment of the present disclosure will be described with reference to FIG. 18A to FIG. 19.

An upper corner fitting 220 and a lower corner fitting 120 are provided at corners of the upper panel 200 and the lower panel 100, respectively.

The upper corner fitting 220 and the lower corner fitting 120 are provided to endure a load applied when the foldable containers 10 are stacked in multiple stages, and when the foldable containers 10 are folded and stacked and then transported in batches, the corner fittings of the containers 10 are fixed to suppress unfolding of the foldable containers 10.

Further, the foldable container 10 may include the upper reinforcing piece 230 and the lower reinforcing piece 130 to fix the folded foldable container 10 not to be unfolded and endure a load applied when multiple containers are stacked on the folded foldable container 10.

The upper reinforcing piece 230 may be extended downwards from the upper corner fitting 220 and may include a fastening piece 231.

The lower reinforcing piece 130 may be extended upwards from the lower corner fitting 120 and may include a fastening piece fixing unit 131 to which the fastening piece 231 is inserted and fastened.

An extension length of the upper reinforcing piece 230 and the lower reinforcing piece 130 may be appropriately selected in consideration of a thickness of the folded container.

For example, desirably, the upper reinforcing piece 230 and the lower reinforcing piece 130 may be extended to an appropriate length, so that when the foldable container is fully folded, the fastening piece 231 can be inserted into the fastening piece fixing unit 131 and fastening holes 231a formed in the fastening piece 231 can match up with fastening holes f formed in the fastening piece fixing unit 131, respectively.

Therefore, when the container 10 is folded, the upper reinforcing piece 230 is safely placed on the lower reinforcing piece 130 and the fastening piece 231 is inserted into the fastening piece fixing unit 131 at the same time, and then, the fastening piece 231 is fixed to the fastening piece fixing unit 131 by allowing fastening members to pass through the fastening holes 231a formed in the fastening piece 231 and the fastening holes 132 formed in the fastening piece fixing unit 131. Therefore, it is possible to endure a load applied when the containers 10 are stacked in multiple stages and thus possible to suppress damage to the containers 10 by weight, and also possible to suppress unfolding of the folded container 10 during transport.

Further, if the container 10 is unfolded, the front panel 400 can be fixed to the upper panel 200, the lower panel 100, and the lateral panel 300 by allowing the fastening members such as bolts to pass through the fastening holes 132 and 232 formed in the upper reinforcing piece 230 and the lower reinforcing piece 130 and then to be inserted into lateral upper and lower parts of the front panel 400. Thus, when the container 10 is unfolded, the container 10 can stably stand up. Further, force applied when the foldable container 10 is lifted up by the folding/unfolding apparatus or another crane or stacked in multiple stages is not concentrated on a connection portion between the upper panel 200 and the upper lateral panel 310 and a connection portion between the lower panel 100 and the lower lateral panel 320, but can be dispersed to the front panel 400.

An upper side sill 250 included in the upper panel 200 and a lower side sill 150 included in the lower panel 100 will be described with reference to FIG. 20 to FIG. 23B.

An upper part of the upper side sill 250 may be connected to a longitudinal frame of the upper panel 200 and a lower part thereof may be hinge-connected to an upper part of the upper lateral panel 310.

Further, a lower part of the lower side sill 150 may be connected to a longitudinal frame of the lower panel 100 and an upper part thereof may be hinge-connected to a lower part of the lower lateral panel 320.

The upper side sill 250 may include first upper side sills 251 positioned on a front side and a rear side, respectively, and a second upper side sill 252 positioned between the first upper side sills 251, and the lower side sill 150 may include first lower side sills 151 positioned on a front side and a rear side, respectively, and a second lower side sill 152 positioned between the first lower side sills 151.

The upper side sill 250 and the lower side sill 150 may be manufactured to have one of a "⊏" shape, a "⊐" shape, a "⌞" shape, a "Ⅱ" shape, a "π" shape, a "☐" shape, an "I" shape, a "H" shape, and a "U" shape, but is not necessarily limited thereto and can be manufactured to have various shapes.

Referring to FIG. 22A to FIG. 23B, in the upper side sill 250, the first upper side sills 251 positioned on a front side and a rear side, respectively, may be manufactured to have a smaller thickness than the second upper side sill 252 in order not to interfere with folding of the front panel 400 or rear panel 500.

Further, in the lower side sill 150, the first lower side sills 151 positioned on a front side and a rear side, respectively, may be manufactured to have a smaller thickness than the second lower side sill 152 in order not to interfere with folding of the front panel 400 or rear panel 500.

In this case, the second upper side sill 252 and the second lower side sill 152 may include one or more side sill reinforcing units 153 and 253 therein and thus can improve the reinforcement.

For example, referring to FIGS. 23A and 23B, the second upper side sill 252 may be formed into a "U" shape and the upper side sill reinforcing unit 253 may be formed into an "I" shape therein and thus can improve the reinforcement. Further, the second lower side sill 152 may be formed into a "U" shape and the lower side sill reinforcing unit 153 may be formed into an "I" shape therein and thus can improve the reinforcement.

Since the upper side sill 250 and the lower side sill 150 are positioned on the upper panel 200 and the lower panel 100, respectively, it is possible to suppress deformation of the upper panel 200 caused by weight or deformation of the lower panel 100 caused by a freight load applied when freight is loaded.

A fixing member of the lower lateral panel according to the present disclosure will be described with reference to FIG. 24 to FIG. 25B.

The lower lateral panel 320 may be fixed to the lower side sill 150 by a fixing member 154 so as not to be rotated.

More specifically, multiple "U"-shaped grooves 322 which are open inwards are formed on a lower part of the lower lateral panel 320, a protruding screw is inserted into an upper surface of the lower side sill 150, and a bolt is combined with the screw unit, and, thus, the lower lateral panel 320 can be fixed not to be rotated.

A panel connection protection unit 600 and an elastic member 700 in accordance with an exemplary embodiment of the present disclosure will be described with reference to FIG. 26A to FIG. 31B.

The panel connection protection unit 600 may be positioned on each of panels provided adjacent to each other in a left-and-right or up-and-down relationship.

In other words, the panel connection protection unit 600 may be formed by extending an outer surface of a panel toward its adjacent panel in order for a seam between the adjacent panels not to be directly exposed to the outside.

Specifically, the panel connection protection unit 600 may be formed by extending an upper panel to an outer lower direction of a lower panel, so that seams of connection portions where the upper panel 200 and the upper lateral panel 310, the upper lateral panel 310 and the lower lateral panel 320, and the lower lateral panel 320 and the lower panel 100 meet each other in an up-and-down relationship, respectively, cannot be directly exposed to the outside. Further, the panel connection protection unit 600 may be formed by being extended inwards from a front surface or rear surface of the lateral panel 300, so that a seam where the lateral panel 300 and the front panel 400 or rear panel 500 meet each other in a left-and-right relationship cannot be directly exposed to the outside.

In the foldable container 10, a seam between panels is not welded, and, thus, freight can be stolen by inserting a tool through the seam. Particularly, if freight being transported is grain which is transported in bulk, a tool with a sharp end may be inserted through a seam between panels to form a small crack and the grain may be stolen through the crack.

However, in the foldable container 10 according to the present disclosure, the panel connection protection unit 600 is positioned at a seam between panels, and, thus, the seam is not directly exposed to the outside. Therefore, it is possible to suppress stealing of freight.

Each elastic member 700 may be positioned between panels provided adjacent to each other and may be formed of an elastic material. However, the present disclosure is not limited thereto, and the elastic member 700 may not be positioned between the panels provided adjacent to each other, and, thus, the panels may be in direct contact with each other.

For example, referring to FIGS. 27A and 27B, the panel connection protection unit 600 may be formed by downwardly extending a lateral surface of the upper panel 200 in a longitudinal direction. However, the present disclosure is not limited thereto, and the panel connection protection unit 600 may be connected to a lateral lower part in a longitudinal direction of the upper panel 200 as an "I"-shaped member to cover a seam between the upper panel 200 and the upper lateral panel 310 or may be connected to a lower surface in the longitudinal direction of the upper panel 200 as a " ⊐ "-shaped member.

Referring to FIGS. 28A and 28B, the panel connection protection unit 600 may be formed by downwardly extending a lateral surface of the upper lateral panel 310 in a longitudinal direction. However, the present disclosure is not limited thereto, and the panel connection protection unit 600 may be connected to a lateral lower part of the upper lateral panel 310 as an "I"-shaped member to cover a seam between the upper lateral panel 310 and the lower lateral panel 320 or may be connected to a lower surface of the upper lateral panel 310 as a " ⊐ "-shaped member.

Further, the elastic member 700 may be positioned between the upper lateral panel 310 and the lower lateral panel 320 to relieve shock generated during folding.

Referring to FIGS. 29A and 29B, the panel connection protection unit 600 may be formed by downwardly extending a lateral surface of the lower lateral panel 320 in a longitudinal direction. However, the present disclosure is not limited thereto, and the panel connection protection unit 600 may be connected to a lateral lower part of the lower lateral panel 320 as an "I"-shaped member to cover a seam between the lower lateral panel 320 and the lower panel 100 or may be connected to a lower surface of the lower lateral panel 320 as a " ⊐ "-shaped member.

Referring to FIG. 30A, the panel connection protection unit 600 may be formed by downwardly extending a lateral surface of the upper panel 200 in a transverse direction. However, the present disclosure is not limited thereto, and the panel connection protection unit 600 may be connected to a lateral lower part of a transverse frame of the upper panel 200 as an "I"-shaped member to cover a seam between the upper panel 200 and the front panel 400 or may be connected to a lower surface of the transverse frame of the upper panel 200 as a " ⊐ "-shaped member.

Referring to FIG. 30B, in the lateral panel 300 and the front panel 400 provided adjacent to each other in a left-and-right relationship, the panel connection protection unit 600 may be formed by being extended inwards from a front surface or rear surface of the lateral panel 300. However, the present disclosure is not limited thereto, and the panel connection protection unit 600 may be connected to a front or rear frame of the lateral panel as an "I"-shaped member or " ⊐ "-shaped member to cover a seam between the front panel 400 and the lateral panel 300.

Due to the connection protection unit 600 and the elastic member 700, an outer surface of an upper panel among panels provided adjacent to each other is downwardly extended or a separate member is connected, and, thus, it is possible to suppress the introduction of foreign materials into the foldable container 10 through a seam between the panels.

Hereinafter, a front frame 480 constituting the front panel 400 will be described with reference to FIGS. 31A and 31B.

An upper part of the front frame 480 may include upper fastening holes 481 formed corresponding to the fastening holes 232 formed in the upper reinforcing piece 230 and a lower part thereof may include lower fastening holes 482 formed corresponding to the fastening holes 132 formed in the fastening piece fixing unit 131 of the lower reinforcing piece 130.

Further, if the container 10 is unfolded, the front frame 480 may be fastened to the upper reinforcing piece 230 and the lower reinforcing piece 130 by fastening members passing through the fastening holes 232 formed in the upper reinforcing piece 230 and the upper fastening holes 481 and fastening members passing through the fastening holes 132 formed in the lower reinforcing piece 130 and the lower fastening holes 482 and thus fixed to the lower panel 100, the upper panel 200, and the lateral panel 300.

Further, the front frame 480 may be formed to have a thickness and a width sufficient to endure tensile force when the upper part of the foldable container 10 is lifted if the container is unfolded and a stacking load applied when multiple containers are stacked.

Furthermore, the front frame 480 includes elastic members on both inner sides of the container 10 and thus can suppress the introduction of foreign materials between the front panel 400 and the lateral panel 300.

The rear frame includes components similar to those of the front frame 480 and is symmetrically provided with the front frame 480. Therefore, an explanation of the rear frame will be omitted.

Further, referring to FIG. 33, the foldable container 10 may further include panel connection units 900 respectively positioned on both ends of the lateral panel 300 in a longitudinal direction and formed into a "⊏" shape into which the front frame 480 or rear frame can be inserted.

Therefore, when the foldable container 10 is unfolded, the lateral panel 300 may be connected to the front panel 400 and the rear panel 500 and the introduction of foreign materials between the front panel 400 or rear panel 500 and the lateral panel 300 can be suppressed.

Hereinafter, a method of folding and unfolding the present foldable container 10 will be described with reference to FIG. 34 to FIG. 36.

Firstly, referring to FIG. 34, container folding/unfolding apparatuses 800 may be positioned on a front surface and a rear surface, respectively, of the foldable container 10.

Then, a lower fixing unit 820 may be fixed to the lower corner fitting 120 of the lower panel 100.

Then, the worker may enter the foldable container 10 to release the folding fixing unit 340 and the fixing member 154 of the lower lateral panel 320, unfold the lateral panel supporting unit 360, and remove bolts or pins of the upper reinforcing piece 230 and the lower reinforcing piece 130 binding the front panel 400 and the rear panel 500.

Then, an folding/unfolding unit 840 including a motor may be used to move the upper panel 200 and the upper lateral panel 310 connected thereto upwards a predetermined distance using the sliding joint 330 and then fix the upper panel 200 and the upper lateral panel 310 using an upper fixing unit 830.

Then, after it is checked whether or not the protrusions 240 and 410 get out of the recessions 210 and 440 of the upper panel 200, the folding/unfolding unit 840 may be used to fold the front panel 400 and the rear panel 500 toward the inside of the foldable container 10.

For example, referring to FIG. 35, a dead-end of a wire 841 of the folding/unfolding unit 840 may be fixed to the rings 430 provided on the upper part of the front panel 400 or rear panel 500, and the wire 841 may be slowly unwound to slowly fold and unfold the front panel 400 and the rear panel 500.

Then, the upper fixing unit 830 may be released, and the folding/unfolding unit 840 may slowly move the upper panel 200 and the lateral panel 300 downwards to fold and unfold the upper panel 200 and the lateral panel 300 (see FIG. 36).

Then, the upper reinforcing piece 230 of the upper corner fitting 220 and the lower reinforcing piece 130 of the lower corner fitting 120 are connected through the fastening members to suppress unfolding of the folded foldable container 10.

The process of folding the foldable container 10 has been described above, and the foldable container 10 can be unfolded in in reverse order.

In this case, the container folding/unfolding apparatus 800 may further include a control unit to automatically control the above-described process.

Hereinafter, the container folding/unfolding apparatus 20 for folding and unfolding the present foldable container 10 will be described with reference to FIG. 37 to FIG. 58B.

The present foldable container folding/unfolding apparatus 20 may be positioned on each of a front surface or a rear surface of the foldable container 10 as illustrated in FIG. 37 to fold and unfold the foldable container 10.

Referring to FIG. 38 and FIG. 39, the present foldable container folding/unfolding apparatus 20 includes a main body 1100, an upper fixing unit 1300 provided on an upper part of the main body 1100 and configured to fix the upper part of the foldable container 10, a front/rear side folding/unfolding unit 1400 provided on the upper part of the main body 1100 and configured to fold and unfold the front panel 400 and the rear panel 500 of the foldable container 10, and an up/down folding/unfolding unit 1500 configured to move the upper fixing unit 1300 up and down to move the upper panel 200 and the lateral panel 300 of the foldable container 10 up and down. Further, multiple wheels 1101 are provided under the main body 1100, and, thus, the present foldable container folding/unfolding apparatus 20 can be easily moved.

Furthermore, the present foldable container folding/unfolding apparatus 20 may further include a lower fixing unit 1200 provided on a lower part of the main body 1100 and configured to fix the lower part of the foldable container 10.

The lower fixing unit 1200 and the upper fixing unit 1300 in accordance with an exemplary embodiment of the present disclosure will be described with reference to FIG. 40A to FIG. 42B.

Referring to FIG. 40A, FIG. 41A and FIG. 41B, the lower fixing unit 1200 may include a lower fixing piece 1210 inserted into an insertion groove 120*a* formed in the lower corner fitting 120 of the foldable container 10 and a lower lever 1220 configured to rotate the lower fixing piece 1210.

Specifically, if the main body 1100 is positioned on the front surface or the rear surface of the foldable container 10, the lower fixing piece 1210 of the lower fixing unit 1200 may be inserted into the insertion groove 120*a* formed in the lower corner fitting 120 of the foldable container 10. Further, after the lower fixing piece 1210 is inserted into the insertion groove 120*a* in the lower corner fitting 120, the lower fixing piece 1210 is rotated by rotating the lower lever 1220, and, thus, the lower fixing unit 1200 can be fixed to the lower corner fitting 120.

Referring to FIG. 40B, FIG. 42A and FIG. 42B, the upper fixing unit 1300 may include an upper fixing piece 1310 inserted into an insertion groove 220*a* formed in the upper corner fitting 220 of the foldable container 10 and an upper lever 1320 configured to rotate the upper fixing piece 1310.

Specifically, if the main body 1100 is positioned on the front surface or the rear surface of the foldable container 10, the upper fixing piece 1310 of the upper fixing unit 1300 may be inserted into the insertion groove 220*a* formed in the upper corner fitting 220 of the foldable container 10. Further, after the upper fixing piece 1310 is inserted into the insertion groove 220*a* in the upper corner fitting 220, the upper fixing piece 1310 is rotated by rotating the upper lever 1320, and, thus, the upper fixing unit 1300 can be fixed to the upper corner fitting 220.

Further, the upper fixing unit 1300 may be vertically movably connected to a ball screw 1510 of the up/down folding/unfolding unit 1500 to be described later.

Hereinafter, the main body 1100 in accordance with an exemplary embodiment of the present disclosure will be described in detail with reference to FIG. 38 and FIG. 39.

The wheels 1101 may be provided under the main body 1100, so that the worker can push the main body 1100 to be positioned on the front surface or rear surface of the foldable container 10.

Further, the main body 1100 may include a lower frame 1110, a pillar frame 1120, and an upper frame 1130.

The lower frame 1110 may be positioned on both sides of the front surface or rear surface of the foldable container 10. The both sides may refer to directions in which the lateral panels 300 of the foldable container 10 are positioned.

Specifically, the lower frame 1110 may include a first lower lateral frame 1111 positioned on one side of the foldable container 10 and a second lower lateral frame 1112 positioned on the other side of the foldable container 10.

Further, if the foldable container folding/unfolding apparatus 20 is provided in the foldable container 10, the lower frame 1110 may be formed to be elongated toward the inside of the both sides of the foldable container 10. Therefore, it is possible to suppress falling of the present foldable container folding/unfolding apparatus 20 toward the inside when the foldable container 10 is folded and unfolded.

Furthermore, the lower frame 1110 may further include a lower frame reinforcing unit 1113 of which one end is connected to one end of the first lower lateral frame 1111 and the other end is connected to one end of the second lower lateral frame 1112.

The pillar frame 1120 may be extended upwards from an upper surface on one side of the lower frame 1110. For example, the pillar frame 1120 may be formed into a one-side open "⌐" shape as illustrated in FIG. 38 and FIG. 39.

Further, the pillar frames 1120 may include a first pillar frame 1121 extended upwards from an upper surface on one side of the first lower lateral frame 1111 and a second pillar frame 1122 extended upwards from an upper surface on one side of the second lower lateral frame 1112.

Furthermore, a ladder 1124 may be positioned on one side of the pillar frame 1120.

For example, the worker may use the ladder 1124 to climb to an upper part of the main body 1100 and manipulate the upper lever 1320 of the upper fixing unit 1300.

Each of both ends of the upper frame 1130 may be connected to an upper part of the pillar frame 1120. Further, the front/rear side folding/unfolding unit 1400 may be connected to a central part of the upper frame 1130.

For example, the upper frame 1130 may be connected to an upper part of the ladder 1124 as illustrated in FIG. 38 and FIG. 39, but is not limited thereto, and the both ends of the upper frame 1130 may be connected and fixed to the first pillar frame 1121 and the second pillar frame 1122, respectively.

The main body 1100 may further include a pillar reinforcing unit 1160 of which one end is connected to the pillar frame 1120 and the other end is connected to the lower frame 1110. When the foldable container 10 is folded, the pillar reinforcing unit 1160 may support force applied to the pillar frame 1120 from the inside of the foldable container 10 and thus suppress bending of the pillar frame 1120.

The main body 1100 may further include an anti-swing unit 1140 of which one end is connected to the lower frame 1110 and the other end is bent toward the bottom.

Specifically, the anti-swing unit 1140 may be connected to an outer surface of the lower frame 1110 and the other end thereof may be bent toward the ground, and, thus, the anti-swing unit 1140 may be formed into a " ⏋ " shape. Therefore, if the main body 1100 is swung by external force, the other end of the anti-swing unit 1140 touches the ground, and, thus, it is possible to suppress swings of the main body 1100.

The main body 1100 may further include main body fixing units 1150 which are positioned on both sides, respectively, and of which lower end surfaces are in close contact with the ground to fix the main body 1100.

Specifically, the foldable container folding/unfolding apparatus 20 is positioned on the front surface or rear surface of the foldable container 10 and then the main body fixing units 1150 are moved toward the ground, and, thus, the lower end surfaces of the main body fixing units 1150 can be brought into close contact with the ground. Therefore, even if the ground on which the foldable container folding/unfolding apparatus 20 is installed is not flat, the foldable container folding/unfolding apparatus 20 can be stably fixed.

Referring to FIG. 39, the front/rear side folding/unfolding unit 1400 may include a wire 1410 connected to the rings 430 or the rod bar 460 provided on the front panel 400 or rear panel 500 and a motor 1420 configured to wind or unwind the wire 1410.

Specifically, the rings 430 or the rod bar 460 may be connected to the upper part of the front panel 400 or rear panel 500, and an end of the wire 1410 may be connected to the rings 430 or the rod bar 460 and the motor 1420 may be rotated to slowly wind or unwind the wire 1410 and fold and unfold the front panel 400 or rear panel 500.

The up/down folding/unfolding unit 1500 in accordance with an exemplary embodiment of the present disclosure will be described with reference to FIG. 43A to FIG. 45.

The up/down folding/unfolding unit 1500 may include the ball screw 1510 which is extended in a vertical direction and includes a screw thread on its outer circumference surface and to which the upper fixing unit 1300 is connected to be movable in a vertical direction and a driving unit 1520 which is connected to the ball screw 1510 and configured to rotate the ball screw 1510.

That is, the upper fixing unit 1300 may be provided on the ball screw 1510 to be movable in a vertical direction and moved in the vertical direction along the screw thread of the ball screw 1510 as the driving unit 1520 is driven.

Specifically, referring to FIG. 45, the ball screw 1510 may include a first ball screw 1511 provided on the first pillar frame 1121 and a second ball screw 1512 provided on the second pillar frame 1122.

The up/down folding/unfolding unit 1500 may include a gear unit 1530 connected to the ball screw 1510 and a chain unit 1540 engaged with the gear unit 1530 to transmit driving force (see FIG. 44).

In other words, the gear unit 1530 may include a first gear unit 1531 connected to the first ball screw 1511 and a second gear unit 1532 connected to the second ball screw 1512. Further, the chain unit 1540 may be engaged with the first gear unit 1531 and the second gear unit 1532 to transmit driving force.

Specifically, the up/down folding/unfolding unit 1500 may further include the gear unit 1530 and the chain unit 1540 and thus transmit driving force of the first ball screw 1511 to the second ball screw 1512 through the chain unit 1540 to rotate the first ball screw 1511 and the second ball screw 1512. However, the present disclosure is not limited thereto, and the driving unit 1520 may be provided on each of the first ball screw 1511 and the second ball screw 1512 to independently rotate the ball screws 1511 and 1512.

For example, the first ball screw 1511 is rotated as the driving unit 1520 is driven, as illustrated in FIG. 45. In this case, the chain unit 1540 engaged with the first gear unit 1531 connected to the first ball screw 1511 and the second gear unit 1532 connected to the second ball screw 1512 transmits rotation force of the first ball screw 1511 to the second ball screw 1512. Therefore, the first ball screw 1511 and the second ball screw 1512 can be rotated at the same speed. In this case, the upper fixing unit 1300 connected to each of the first ball screw 1511 and the second ball screw 1512 may be moved up and down, and, thus, the upper panel 200 and the lateral panel 300 of the foldable container 10 can be moved up and down.

Further, referring to FIG. 38, the main body 1100 may include a chain cover unit 1541 configured to protect the chain unit 1540 and thus can suppress safety accident which may be caused by the chain unit 1540.

Referring to FIGS. 43A and 43B, a LM guide unit 1123 may be protruded in a vertical direction on the pillar frame 1120, and the upper fixing unit 1300 may include a guide groove 1330 to which the LM guide unit 1123 is inserted. Therefore, the upper fixing unit 1300 may be guided to move up and down in a vertical direction and external force may be dispersed to the ball screw 1510 and the LM guide unit 1123.

Further, the upper fixing unit 1300 may include a guide unit 1340 to be brought into close contact with an outer surface of the foldable container 10.

The guide unit 1340 may be brought into close contact with the outer surface of the foldable container when the upper fixing unit 1300 is moved up and down and thus can suppress swings of the foldable container 10 to left and right directions.

Referring to FIG. 46 and FIG. 47, the main body 1100 of the foldable container folding/unfolding apparatus 20 may include a first main body 1100*a*, a second main body 1100*b*, and a third main body 1100*c*.

The front/rear side folding/unfolding unit 1400 may be positioned on the first main body 1100*a*, and the second main body 1100*b* and the third main body 1100*c* may be connected to one end and the other end, respectively, of the first main body. Further, the up/down folding/unfolding unit 1500 may be provided on each of the second and third main bodies 1100*b* and 1100*c*.

Therefore, when the foldable container folding/unfolding apparatus 20 is moved, the first to third main bodies 1100*a*, 1100*b*, and 1100*c* can be disassembled and easily transported.

A pulley 1430 and a lateral surface fixing unit 1600 of the container folding/unfolding apparatus 20 will be described with reference to FIG. 48 to FIG. 50.

The front/rear side folding/unfolding unit 1400 may further include the pulley 1430 over which the wire 1410 is wound. Therefore, the front panel 400 and the rear panel 500 can be folded with less force, and a distance between the front panel 400 or rear panel 500 and the front/rear side folding/unfolding unit 1400 can be kept, and, thus, the rod bar 460 can be readily used.

Further, the container folding/unfolding apparatus 20 may further include a lateral side fixing unit 1600 configured to fix the lateral panel 300 of the container 10.

The lateral side fixing unit 1600 may be positioned on each of both lateral sides of the main body 1110 and may include a wire fixing unit 1610 of which one end is configured to fix a wire for fixing the lateral panel 300 of the container 10 and an insertion fixing unit 1620 to which the other end of the wire fixing unit 1610 is inserted and fixed. Therefore, the lateral panel 300 is fixed by the wire fixing unit 1610, and, thus, the front panel 400 and the rear panel 500 can be smoothly rotated and folded without interference in the lateral panel 300.

Hereinafter, a foldable container folding/unfolding apparatus 1800 in accordance with another exemplary embodiment of the present disclosure will be described with reference to FIG. 51 to FIG. 52.

The foldable container folding/unfolding apparatus 1800 in accordance with another exemplary embodiment of the present disclosure may include a main body 1810 including wheels 1810*a* thereunder, a lower fixing unit 1820 provided under the main body 1810 and configured to fix a lower part of the foldable container 10, an upper fixing unit 1830 provided on the main body 1810 and configured to fix an upper part of the foldable container 10, a front/rear side folding/unfolding unit 1840 provided on the main body 1810 and configured to fold and unfold the front panel 400 and the rear panel 500 of the foldable container 10, and an up/down folding/unfolding unit 1850 provided on the main body 1810 and configured to move the upper fixing unit 1830 up and down to move the upper panel 200 and the lateral panel 300 of the foldable container 10 up and down.

The foldable container folding/unfolding apparatus 1800 in accordance with another exemplary embodiment of the present disclosure includes the up/down folding/unfolding unit 1850 on the main body 1810 unlike the foldable container folding/unfolding apparatus 20 in accordance with an exemplary embodiment of the present disclosure.

Further, the main body 1810 may include a lower lateral frame 1811 positioned on each of lateral sides of the foldable container 10, a pillar frame 1811 extended upwards from an upper surface of the lower lateral frame 1811, a first upper frame 1813 connected to an upper part of the pillar frame 1812 and connected to the front/rear side folding/unfolding unit 1840, and a second upper frame 1814 connected to the upper part of the pillar frame 1812 and connected to the up/down folding/unfolding unit 1850.

Further, the up/down folding/unfolding unit 1850 may include a driving unit 1851 connected to the second upper frame 1814 and an up/down moving frame 1852 of which both ends are connected to the upper fixing unit 1830 and which is moved up and down by the driving unit 1851.

Referring to FIG. 52, the upper fixing unit 1830 may include an upper fixing piece 1831 to be inserted into the insertion groove formed in an upper part of the upper corner fitting 220 of the foldable container 10 and an upper lever 1832 configured to rotate the upper fixing piece 1831.

An operation unit 1900 in accordance with an exemplary embodiment of the present disclosure will be described with reference to FIG. 53 and FIG. 54.

The operation unit 1900 may be provided in the back of the lower frame 1110. Further, the worker may move the foldable container folding/unfolding apparatus 20 through the operation unit 1900.

Specifically, the operation unit 1900 may include an operation motor (not illustrated), a battery unit 1910 configured to supply power to the operation motor, a wheel 1920 driven by the operation motor, and a control unit 1930. Therefore, the worker may manipulate the control unit 1930 to move the foldable container folding/unfolding apparatus 20 to a desired place.

Herein, the battery unit 1910 may supply power to the motor 1420 of the front/rear side folding/unfolding unit 1400 and the driving unit 1520 of the up/down folding/unfolding unit 1500.

Hereinafter, a method of folding and unfolding the foldable container 10 using the foldable container folding/unfolding apparatus 20 in accordance with an exemplary embodiment of the present disclosure will be described with reference to FIG. 55 to FIG. 58B.

Figure 55:
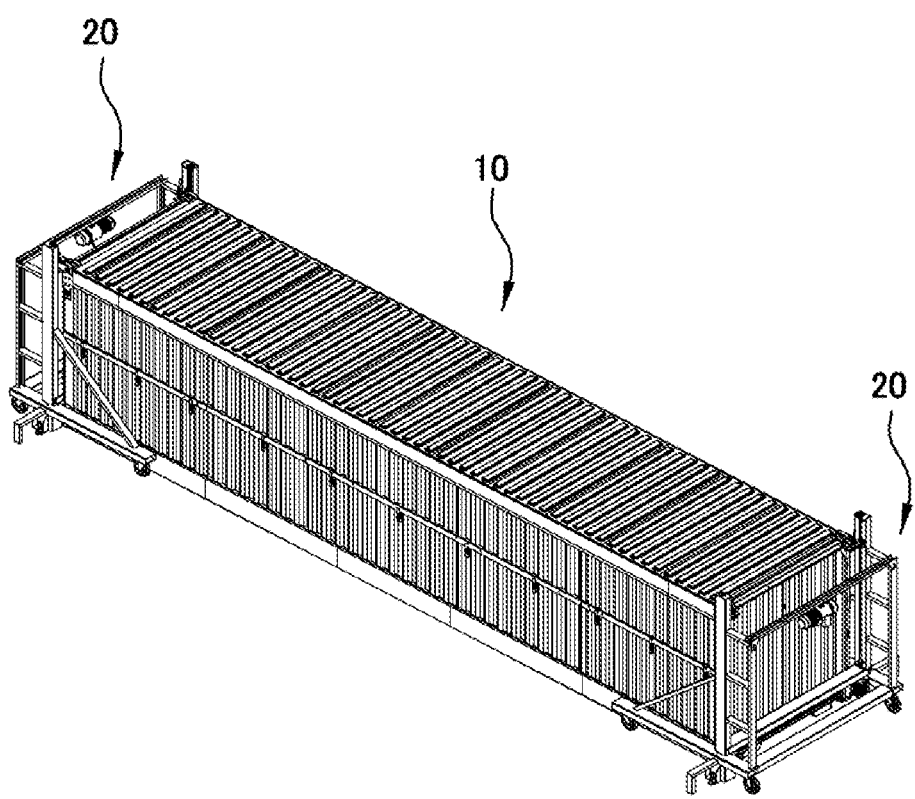
FIG. 55 to FIG. 58B are diagrams provided to explain a method of folding and unfolding a foldable container using the apparatus for folding and unfolding a foldable container in accordance with an exemplary embodiment of the present disclosure.

Firstly, referring to FIG. 55, the foldable container folding/unfolding apparatuses 20 may be positioned in front and back, respectively, of the foldable container 10.

Then, the lower fixing unit 1200 may be fixed to the lower corner fitting 120 of the foldable container 10 and the upper fixing unit 1300 may be fixed to the upper corner fitting 220 of the foldable container 10.

For example, if the worker pushes the main body 1100 to be in close contact with the foldable container 10, the lower fixing piece 1210 of the lower fixing unit 1200 may be inserted into the insertion groove 120*a* formed in the lower corner fitting 120 and the upper fixing piece 1310 of the upper fixing unit 1300 may be inserted into the insertion groove 220*a* formed in the upper corner fitting 220. Then, the worker may fix the lower fixing unit 1200 to the lower corner fitting 120 by rotating the lower lever 1220 of the lower fixing unit 1200 and may fix the upper fixing unit 1300 to the upper corner fitting 220 by rotating the upper lever 1320 of the upper fixing unit 1300.

Then, the worker may release fixing members configured to fix the respective panels of the foldable container 10.

Then, the worker may operate the driving unit 1520 of the up/down folding/unfolding unit 1500 to move the upper panel 300 and the upper lateral panel 310 of the foldable container 10 upwards a predetermined distance. In this case, fixing devices configured to fix the front panel 400 and the rear panel 500 may be released.

Figure 56:
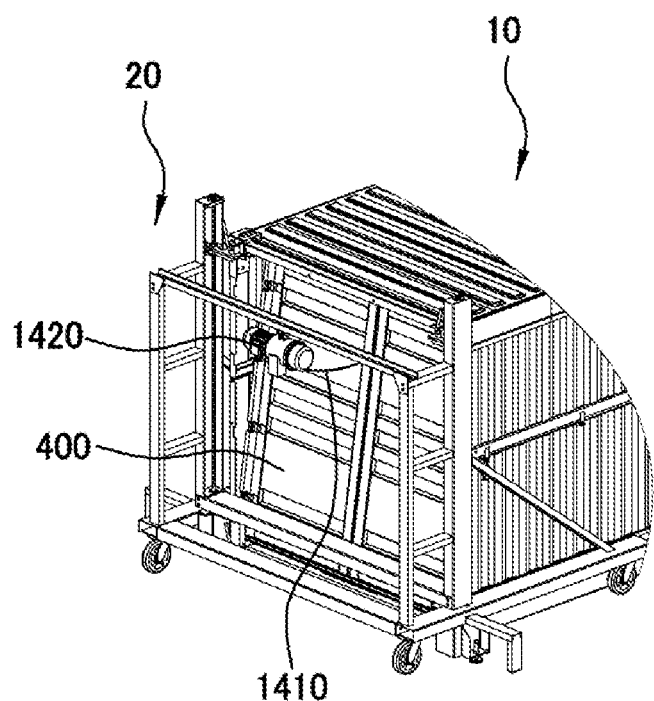
Figure 57A:
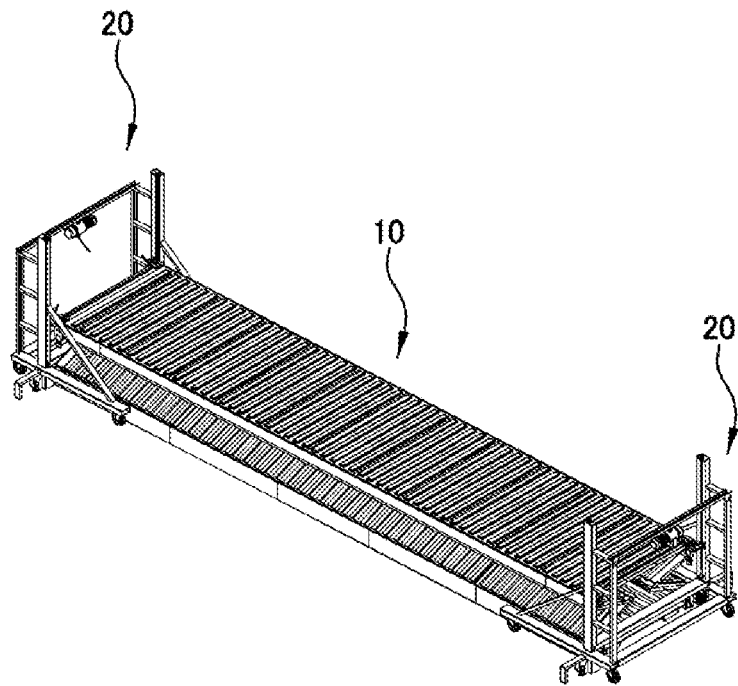
Figure 57B:
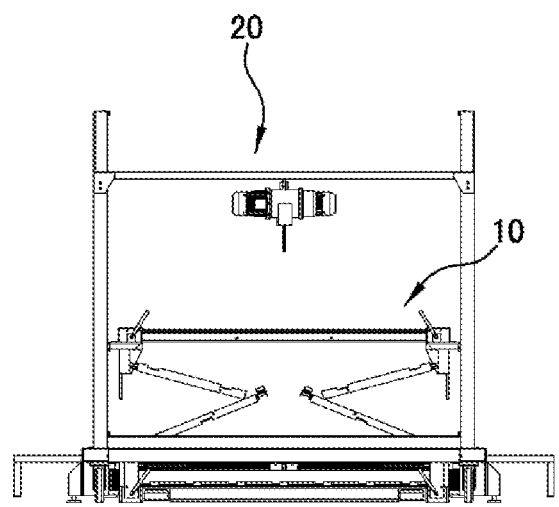
Figure 58A:
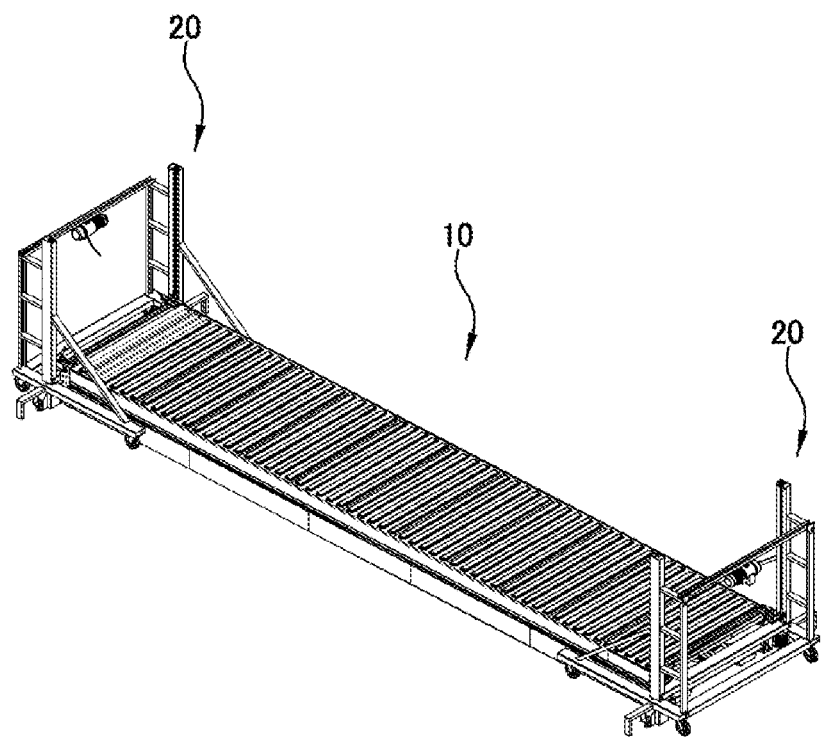
Figure 58B:
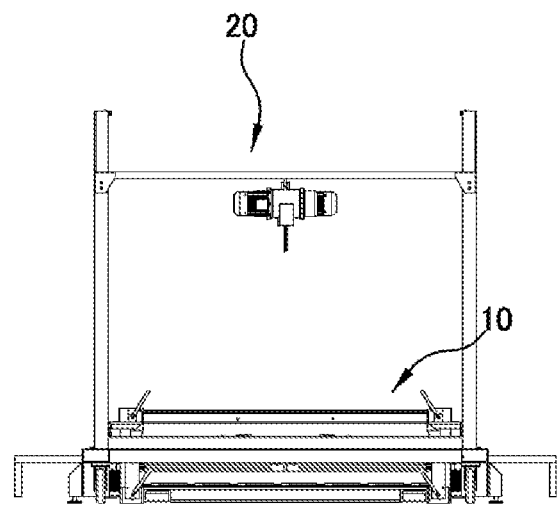

Then, the wire 1410 of the front/rear side folding/unfolding unit 1400 may be connected to the rings 430 or the rod bar 460 provided on the front panel 400 or rear panel 500, and the motor 1420 of the front/rear side folding/unfolding unit 1400 may be operated to fold and unfold the front panel 400 or rear panel 500 (see FIG. 56).

For example, the wire 1410 of the front/rear side folding/unfolding unit 1400 may be fixed by hanging an end of the wire 1410 on the rings 430 or the rod bar 460 provided on the upper part of the front panel 400 or rear panel 500 of the foldable container 10 and the motor 1420 may be rotated to slowly unwind the wire 1410 and fold and unfold the front panel 400 and the rear panel 500 as being rotated.

Then, the worker may operate the driving unit 1520 of the up/down folding/unfolding unit 1500 to fold and unfold the upper panel 200 and the lateral panel 300 by slowly moving them downwards (see FIG. 57A to FIG. 58B).

The process of folding the foldable container 10 has been described above, but and the foldable container 10 can be unfolded in in reverse order.

In this case, the container folding/unfolding apparatus 20 may further include a control unit to automatically control the above-described process.

Referring to FIG. 59, the multiple foldable containers 10 may be folded and stacked and then transported and stored in a bundle.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

| | |
|---|---|
| 10: | Foldable container |
| 100: | Lower panel |
| 200: | Upper panel |
| 300: | Lateral panel |
| 400: | Front panel |
| 500: | Rear panel |
| 600: | Panel connection protection unit |
| 700: | Elastic member |
| 20: | Foldable container folding/unfolding apparatus |
| 1100: | Main body |
| 1200: | Lower fixing unit |
| 1300: | Upper fixing unit |
| 1400: | Front/rear side folding/unfolding unit |
| 1500: | Up/down folding/unfolding unit |

We claim:

1. An apparatus located in front/rear of a foldable container for marine transportation for folding and unfolding a foldable container, comprising:
   a main body;
   an upper fixing unit provided on an upper part of the main body and configured to fix an upper part of the foldable container as an upper fixing piece inserted into an insertion groove formed in an upper corner fitting of the foldable container;
   a front/rear side folding/unfolding unit provided on the upper part of the main body and configured to fold and unfold a front panel or a rear panel of the foldable container; and
   an up/down folding/unfolding unit configured to move the upper fixing unit up and down to move an upper panel and lateral panels of the foldable container up and down to fold lateral panel.

2. The apparatus for folding and unfolding a foldable container of claim 1, further comprising:
   multiple wheels under the main body.

3. The apparatus for folding and unfolding a foldable container of claim 1, further comprising:
   a lower fixing unit provided under the main body and configured to fix a lower part of the foldable container.

4. The apparatus for folding and unfolding a foldable container of claim 1,
   wherein the upper fixing unit includes an upper fixing piece inserted into an insertion groove formed in an upper corner fitting of the foldable container and an upper lever configured to rotate the upper fixing piece.

5. The apparatus for folding and unfolding a foldable container of claim 3,
   wherein the lower fixing unit includes a lower fixing piece inserted into an insertion groove formed in a lower corner fitting of the foldable container and a lower lever configured to rotate the lower fixing piece.

6. The apparatus for folding and unfolding a foldable container of claim 1,
   wherein the main body includes:
   a lower frame positioned on each of a front surface or a rear surface and lateral sides of the foldable container;
   a pillar frame extended upwards from an upper surface on one side of the lower frame; and
   an upper frame of which both ends are connected to an upper part of the pillar frame, wherein the front/rear side folding/unfolding unit is connected to the upper frame.

7. The apparatus for folding and unfolding a foldable container of claim 6,
   wherein the main body further includes:
   an anti-swing unit of which one end is connected to the lower frame and the other end is bent toward the bottom.

8. The apparatus for folding and unfolding a foldable container of claim 6,
   wherein the lower frame further includes:
   a main body fixing unit of which a lower end surface is in close contact with the ground to fix the main body.

9. The apparatus for folding and unfolding a foldable container of claim 6,
   wherein the main body further includes:
   a ladder positioned on one side of the pillar frame and having a ladder shape.

10. The apparatus for folding and unfolding a foldable container of claim 1,
    wherein the front/rear side folding/unfolding unit includes a wire connected to rings or a rod bar provided on the front panel or the rear panel and a motor configured to wind or unwind the wire.

11. The apparatus for folding and unfolding a foldable container of claim 1,
    wherein the up/down folding/unfolding unit includes:
    a ball screw which is extended in a vertical direction and includes a screw thread on its outer circumference surface and to which the upper fixing unit is connected to be movable in a vertical direction; and a driving unit connected to the ball screw and configured to rotate the ball screw.

12. The apparatus for folding and unfolding a foldable container of claim 11,
wherein the ball screw includes:
a first ball screw and a second ball screw each connected to the upper fixing unit, and the up/down folding/unfolding unit includes:
a first gear unit and a second gear unit connected to the first ball screw and the second ball screw, respectively, and
a chain unit engaged with the first gear unit and the second gear unit to transmit driving force.

13. The apparatus for folding and unfolding a foldable container of claim 11,
wherein a LM guide unit is protruded in a vertical direction on the pillar frame of the main body, and
the upper fixing unit includes:
a guide groove to which the LM guide unit is inserted.

14. The apparatus for folding and unfolding a foldable container of claim 11,
wherein the upper fixing unit further includes:
a guide unit to be brought into close contact with an outer surface of the foldable container.

15. The apparatus for folding and unfolding a foldable container of claim 1,
wherein the main body includes:
a first main body on which the front/rear side folding/unfolding unit is positioned;
a second main body connected to one side of the first main body; and
a third main body connected to the other side of the first main body,
wherein each of the second and third main bodies includes the up/down folding/unfolding unit.

16. The apparatus for folding and unfolding a foldable container of claim 10,
wherein the front/rear side folding/unfolding unit further includes:
a pulley over which the wire is wound.

17. The apparatus for folding and unfolding a foldable container of claim 6, further comprising:
a lateral side fixing unit configured to fix a lateral panel of the container,
wherein the lateral side fixing unit includes:
a wire fixing unit of which one end is configured to fix a wire for fixing the lateral panel of the container; and
an insertion fixing unit to which the other end of the wire fixing unit is inserted and fixed.

18. The apparatus for folding and unfolding a foldable container of claim 11,
wherein the up/down folding/unfolding unit provided on the upper part of the main body.

19. The apparatus for folding and unfolding a foldable container of claim 18,
wherein the main body includes:
a lower frame positioned on each of the front surface or the rear surface and lateral sides of the foldable container;
a pillar frame extended upwards from an upper surface on one side of the lower frame;
a first upper frame connected to an upper part of the pillar frame and connected to the front/rear side folding/unfolding unit; and
a second upper frame connected to the upper part of the pillar frame and connected to the up/down folding/unfolding unit.

20. The apparatus for folding and unfolding a foldable container of claim 18, further comprising:
a lower fixing unit provided under the main body and configured to fix a lower part of the foldable container.

21. The apparatus for folding and unfolding a foldable container of claim 18,
wherein the upper fixing unit includes an upper fixing piece inserted into an insertion groove formed in an upper corner fitting of the foldable container and an upper lever configured to rotate the upper fixing piece.

22. The apparatus for folding and unfolding a foldable container of claim 20,
wherein the lower fixing unit includes a lower fixing piece inserted into an insertion groove formed in a lower corner fitting of the foldable container and a lower lever configured to rotate the lower fixing piece.

23. The apparatus for folding and unfolding a foldable container of claim 18,
wherein the up/down folding/unfolding unit includes:
a driving unit connected to the second upper frame; and
an up/down moving frame of which both ends are connected to the upper fixing unit and which is moved up and down by the driving unit.

24. The apparatus for folding and unfolding a foldable container of claim 18,
wherein the front/rear side folding/unfolding unit includes a wire connected to rings or a rod bar provided on the front panel or the rear panel and a motor configured to wind or unwind the wire.

* * * * *